(12) United States Patent
Walden

(10) Patent No.: US 12,228,278 B2
(45) Date of Patent: Feb. 18, 2025

(54) MULTI-DIRECTIONAL LUMINAIRE WITH OPPOSING MOUNTING PLATES AND STRUCTURAL SUPPORTS

(71) Applicant: Parabolix Lighting, LLC, Los Angeles, CA (US)

(72) Inventor: Henry David Walden, Los Angeles, CA (US)

( * ) Notice: Subject to any disclaimer, the term of this patent is extended or adjusted under 35 U.S.C. 154(b) by 0 days.

(21) Appl. No.: 18/019,740

(22) PCT Filed: Nov. 24, 2021

(86) PCT No.: PCT/US2021/060818
§ 371 (c)(1),
(2) Date: Feb. 3, 2023

(87) PCT Pub. No.: WO2023/096646
PCT Pub. Date: Jun. 1, 2023

(65) Prior Publication Data
US 2024/0295303 A1  Sep. 5, 2024

(51) Int. Cl.
| | | |
|---|---|---|
| F21V 7/18 | (2006.01) | |
| F21V 17/10 | (2006.01) | |
| F21V 21/108 | (2006.01) | |
| F21V 23/06 | (2006.01) | |
| F21V 29/67 | (2015.01) | |
| F21Y 107/30 | (2016.01) | |
| F21Y 113/00 | (2016.01) | |
| F21Y 115/10 | (2016.01) | |

(52) U.S. Cl.
CPC ............... *F21V 7/18* (2013.01); *F21V 17/10* (2013.01); *F21V 21/108* (2013.01); *F21V 23/06* (2013.01); *F21V 29/673* (2015.01); *F21Y 2107/30* (2016.08); *F21Y 2113/00* (2013.01); *F21Y 2115/10* (2016.08)

(58) Field of Classification Search
CPC . F21V 7/18; F21V 17/10; F21V 17/12; F21V 21/08; F21V 23/06; F21V 29/673; F21Y 2107/30
See application file for complete search history.

(56) References Cited

U.S. PATENT DOCUMENTS

| | | |
|---|---|---|
| 5,463,536 A | 10/1995 | Chou et al. |
| 5,841,146 A | 11/1998 | Briese |
| 6,787,999 B2 | 9/2004 | Stimae et al. |
| 6,908,214 B2 | 6/2005 | Luk |
| 7,053,557 B2 | 5/2006 | Cross et al. |

(Continued)

OTHER PUBLICATIONS

International Search Report, mailed Mar. 25, 2022 for Appl. No. PCT/US21/60818, filed Nov. 24, 2021.

(Continued)

*Primary Examiner* — Ismael Negron
(74) *Attorney, Agent, or Firm* — AdamsIP, LLC; Stephen Thompson; J. Hunter Adams

(57) ABSTRACT

A luminaire includes an elongated body, a plurality of light sources arranged between opposing ends of the body, mounting plates provided at the opposing ends, and an electrical outlet configured to receive power. The mounting plates include a threaded portion configured to receive a threaded connector for supporting the luminaire from a mounting surface. A lighting modifier might be provided to alter the lighting output.

29 Claims, 16 Drawing Sheets

(56) References Cited

U.S. PATENT DOCUMENTS

| | | | |
|---|---|---|---|
| 7,083,298 B2 | 8/2006 | Pritchard et al. | |
| 7,507,001 B2 | 3/2009 | Kit | |
| 7,524,089 B2 | 4/2009 | Park | |
| 7,534,015 B2 * | 5/2009 | Xu | F21K 9/00 |
| | | | 362/373 |
| 7,654,699 B2 * | 2/2010 | Chang | F21V 29/83 |
| | | | 362/373 |
| 7,810,968 B1 * | 10/2010 | Walker | F21V 21/30 |
| | | | 362/249.02 |
| 7,832,909 B2 | 11/2010 | Wang | |
| 7,862,204 B2 * | 1/2011 | Lodhie | F21V 29/677 |
| | | | 362/249.02 |
| 7,997,770 B1 | 8/2011 | Meurer | |
| 8,128,258 B2 | 3/2012 | Lodhie | |
| 8,585,238 B2 | 11/2013 | Krogman | |
| 8,680,754 B2 | 3/2014 | Premysler | |
| 8,702,265 B2 | 4/2014 | May | |
| 8,727,574 B2 | 5/2014 | Simchak et al. | |
| 8,888,315 B2 | 11/2014 | Edwards et al. | |
| 9,267,662 B2 | 2/2016 | Portmann | |
| 9,638,398 B2 | 5/2017 | Nicolai et al. | |
| 9,673,582 B2 | 6/2017 | Guilmette | |
| 9,915,854 B2 | 3/2018 | Kim | |
| 10,088,111 B2 | 10/2018 | Hudson | |
| 10,119,659 B2 | 11/2018 | Novin et al. | |
| 10,132,488 B1 * | 11/2018 | Waldon | A01G 9/249 |
| 10,539,310 B2 | 1/2020 | Nolan et al. | |
| 10,788,163 B2 * | 9/2020 | Ramaiah | F21K 9/232 |
| 10,941,908 B2 | 3/2021 | May | |
| 11,293,632 B2 * | 4/2022 | Du | F21K 9/232 |
| 11,411,153 B2 * | 8/2022 | Vanderwees | H01L 25/0753 |
| 2005/0281047 A1 | 12/2005 | Coushaine et al. | |
| 2007/0222399 A1 | 9/2007 | Bondy et al. | |
| 2009/0261706 A1 | 10/2009 | Sorella et al. | |
| 2009/0268451 A1 * | 10/2009 | Zheng | F21V 29/713 |
| | | | 362/249.02 |
| 2010/0208457 A1 * | 8/2010 | Keal | F21V 29/767 |
| | | | 362/234 |
| 2011/0012540 A1 * | 1/2011 | Lan | H05B 45/10 |
| | | | 315/320 |
| 2011/0255284 A1 * | 10/2011 | Hiller | F21K 9/232 |
| | | | 362/249.02 |
| 2013/0107527 A1 | 5/2013 | Boyer et al. | |
| 2013/0314916 A1 | 11/2013 | Clore | |
| 2013/0322051 A1 | 12/2013 | Ortiz-Gavin | |
| 2015/0176834 A1 | 6/2015 | Avedon | |
| 2016/0290619 A1 | 10/2016 | Schreder | |
| 2018/0101088 A1 * | 4/2018 | Robinson | G03B 21/2033 |
| 2018/0238523 A1 | 8/2018 | Hudson | |
| 2021/0132469 A1 | 5/2021 | Hudson | |

OTHER PUBLICATIONS

Written Opinion of the International Searching Authority, mailed Mar. 25, 2022 for Appl. No. PCT/US21/60818, filed Nov. 24, 2021.

* cited by examiner

MULTI-DIRECTIONAL LUMINAIRE WITH OPPOSING MOUNTING PLATES AND STRUCTURAL SUPPORTS

CROSS REFERENCES

This application is a U.S. National Stage application of PCT Application Number PCT/US21/60818, filed on Nov. 24, 2021, which application is incorporated herein in its entirety by reference.

FIELD OF THE DISCLOSURE

The subject matter of the present disclosure refers generally to a luminaire for multi-directional lighting and to lighting systems for use in photographic, theatrical, and cinematic settings.

BACKGROUND

Photographers and cinematographers utilize various types of luminaires and lighting systems to provide desired lighting effects upon subjects being photographed or filmed. Such luminaires and lighting systems may also be used for live theatre or any other applications in which lighting effects are desired. Lighting modifiers, such as umbrella reflectors and softboxes, may be utilized to provide soft lighting effects by bouncing light from a luminaire off of a concave, reflective inner surface of the modifier. The luminaire may be mounted within an interior of the lighting modifier, and indirect light from the lighting modifier then creates the softening effects on the subject. Photographers and cinematographers commonly use luminaires with lighting modifiers to control lighting effects for still photography, cinema, stage, videography, or studio applications.

SUMMARY

A luminaire, lighting systems utilizing the luminaire, and methods of utilizing the luminaire are provided. The luminaire may be utilized on its own to provide lighting generally or in combination with a lighting modifier to create lighting effects. The luminaire has an elongate body having a base end and an opposing top end. A base mounting plate is disposed at the base end and a top mounting plate is disposed at the top end. Each of the base mounting plate and the top mounting plate is designed to be individually mounted onto a mounting structure, such as a stand, to support the luminaire on the mounting structure. Thus, the luminaire may be mounted onto the stand or other mounting structure using either one of the base mounting plate or the top mounting plate to provide support for the luminaire, depending on user preference. The luminaire may be operated to provide lighting regardless of the mounting configuration. The stand may also support a lighting modifier, such as an umbrella reflector, having a concave inner reflective surface that defines an interior of the lighting modifier in which the luminaire is disposed when mounted onto the stand. The luminaire may then emit light directly toward the inner reflective surface to produce indirect lighting from the lighting modifier onto a subject. The luminaire includes a light source configured to emit light radially from the elongate body of the luminaire. The light source may comprise a plurality of LED lights distributed radially around an exterior of the body and longitudinally along a length of the body. The luminaire may include a second plurality of LED lights disposed on an exterior side of the top mounting plate. The first and second plurality of lights can be activated independently of each other so that light can be emitted by the luminaire from the first plurality of lights only, from the second plurality of lights only, or from all lights. Each set of lights may be separately controlled by switches, which may be located on the base mounting plate of the luminaire. When the luminaire is mounted with the top mounting plate facing inwardly toward the inner surface of the lighting modifier, the second plurality of lights may be activated to provide additional indirect light bounced off of the reflective inner surface of the lighting modifier. When the luminaire is mounted with the top mounting plate facing outwardly away from the inner surface of the lighting modifier, the second plurality of lights may be deactivated to minimize direct light on the subject, while the lights distributed around the body of the luminaire are activated to provide indirect lighting on the subject.

To mount the luminaire, the base mounting plate may have a first threaded section, and the top mounting plate may have a second threaded section. The luminaire may further comprise a connector having a third threaded section at a first end of the connector and a socket at a second end of the connector for mounting the luminaire onto a mounting arm of the stand. The third threaded section has screw threads that are compatible with both the first threaded section of the base mounting plate and the second threaded section of the top mounting plate. Thus, the connector may be removably secured either to the base mounting plate or to the top mounting plate by mating the third threaded section of the connector with either the first threaded section of the base mounting plate or with the second threaded section of the top mounting plate. Once the connector is secured to the luminaire, the luminaire may be mounted onto the stand by inserting the mounting arm of the stand into the socket of the connector and fastening the connector to the mounting arm. Thus, the base and top mounting plates allow for different mounting configurations for the luminaire.

The body of the luminaire preferably comprises a plurality of heat sink plates disposed in spaced relation to each other to efficiently disperse heat produced by the lights. The luminaire may further comprise a support structure attached to both the base mounting plate and the top mounting plate to provide structural support for components of the luminaire. The support structure may comprise a plurality of rods extending between the base mounting plate and the top mounting plate. Each rod may be attached to the base mounting plate at one end and to the top mounting plate at an opposing end. Individual rods may be distributed around the exterior of the body of the luminaire. The luminaire may further comprise a power supply unit that is external to the body of the luminaire. The power supply unit may be electrically connected to the luminaire via an electrical cord plugged into an electrical socket on the base mounting plate of the luminaire to provide power to the lights. The electrical cord may allow the power supply unit to be connected to and disconnected from the luminaire as needed. The power supply unit may be plugged into mains AC (alternating current) power to supply power to the unit.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

The present disclosure provides a luminaire for multi-directional lighting and lighting systems for use in photographic, theatrical, cinematic, and videography settings in accordance with the independent claims. Preferred embodiments of the claimed invention are reflected in the dependent claims. The claimed invention can be better understood in view of the embodiments described and illustrated in the present disclosure, viz. in the present specification and drawings. In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the invention per se.

In the Summary above and in this Detailed Description, and the claims below, and in the accompanying drawings, reference is made to particular features, including method steps, of the invention as claimed. In the present disclosure, many features are described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features, or with all three of the three possible features. It is to be understood that the disclosure in this specification includes all possible combinations of such particular features. For example, where a particular feature is disclosed in the context of a particular aspect or embodiment, or a particular claim, that feature can also be used, to the extent possible, in combination with/or in the context of other particular aspects or embodiments, and generally in the invention as claimed.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
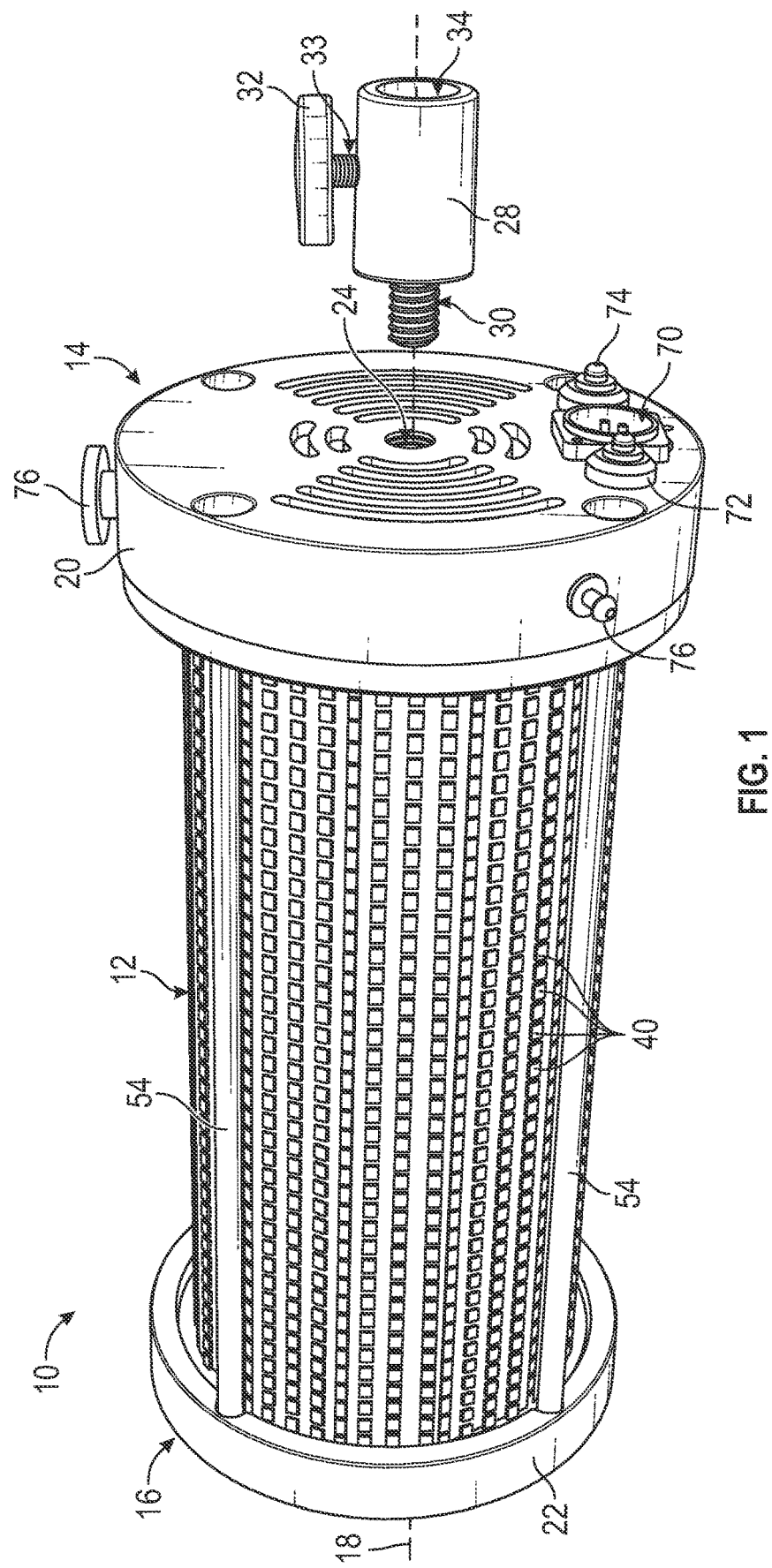
FIG. 1 shows a perspective view of a luminaire in accordance with the present disclosure.
Figure 2:
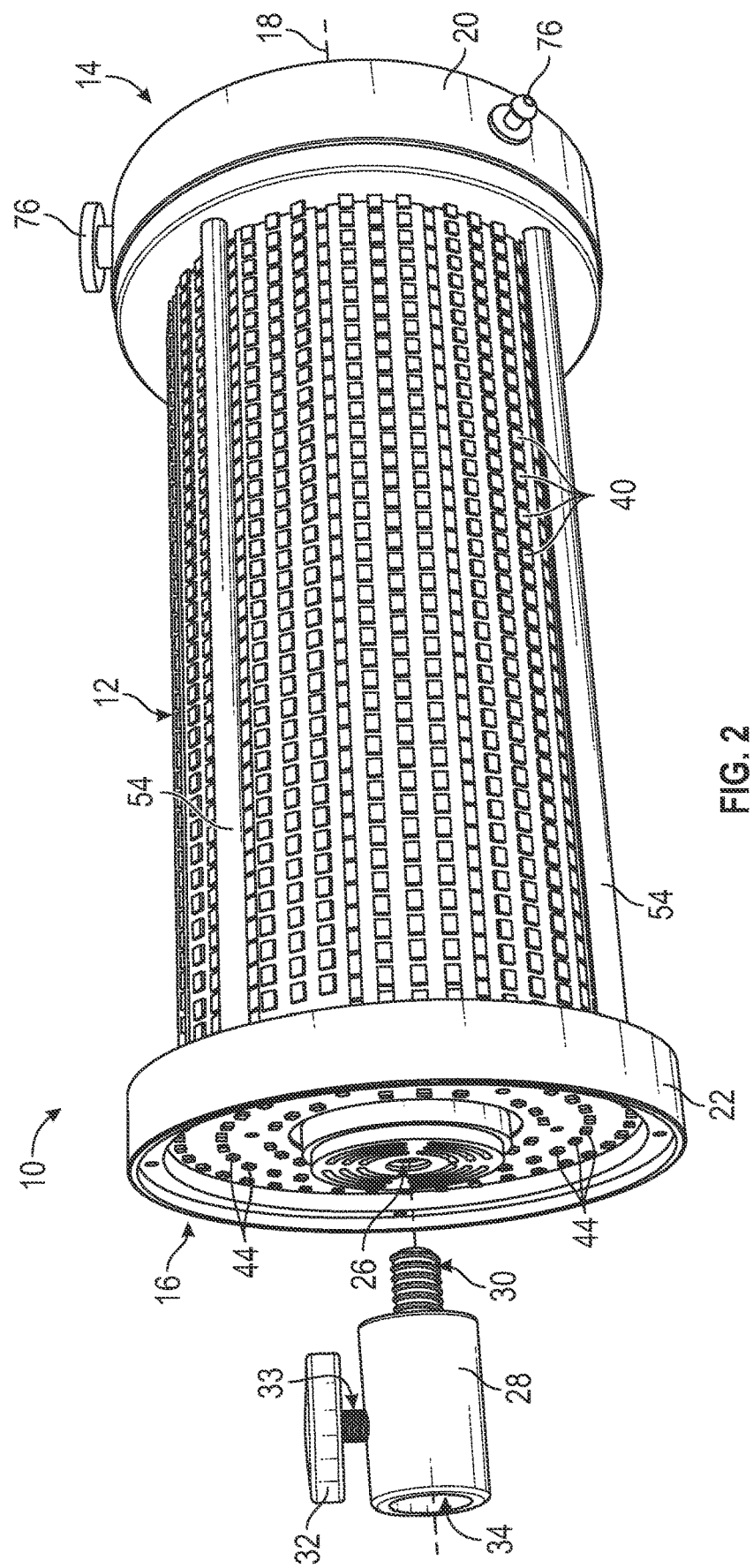
FIG. 2 shows a perspective view of a luminaire in accordance with the present disclosure.
Figure 3:
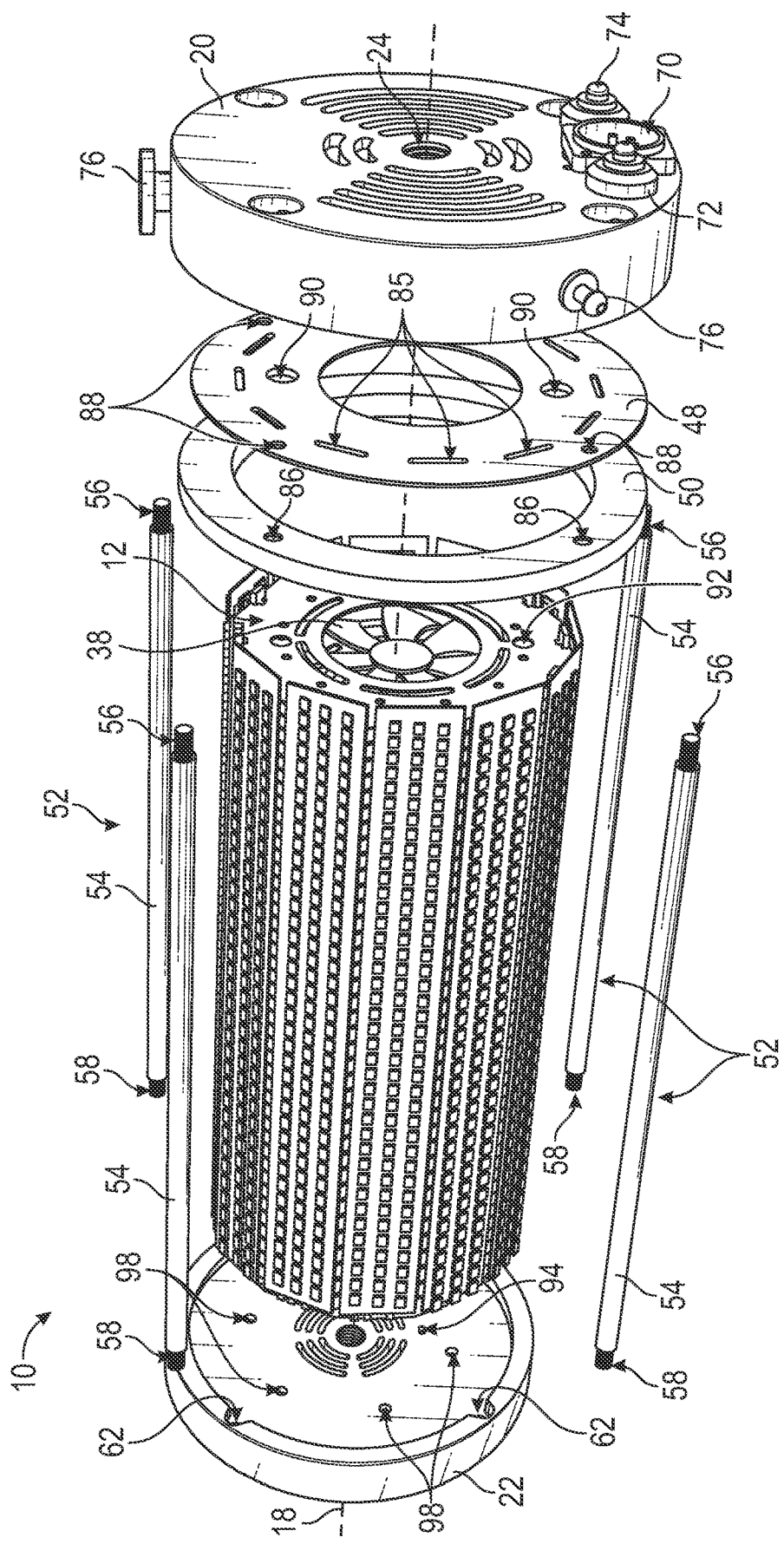
FIG. 3 shows an exploded view of a luminaire in accordance with the present disclosure.
Figure 4:
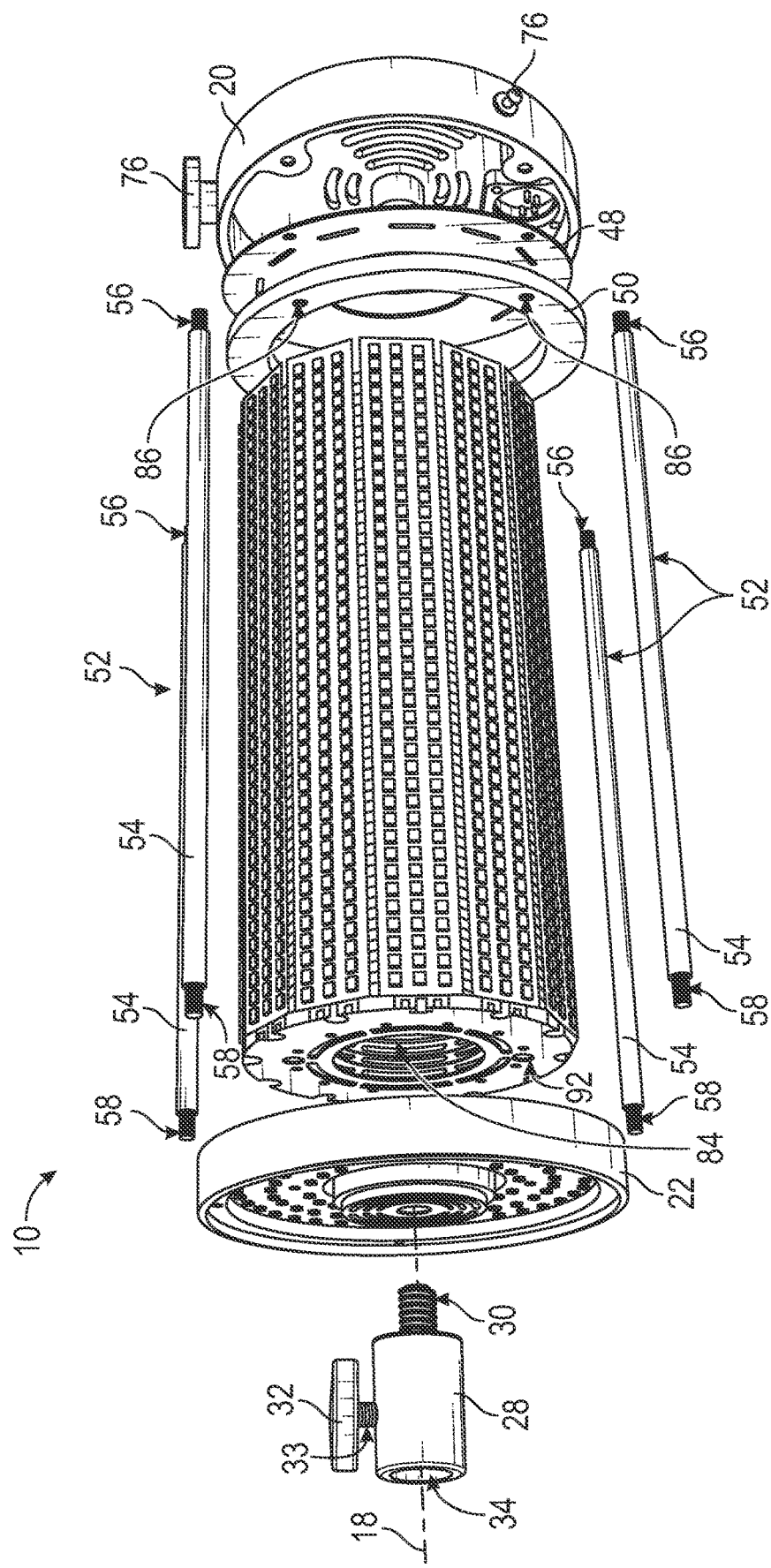
FIG. 4 shows an exploded view of a luminaire in accordance with the present disclosure.
Figure 5:
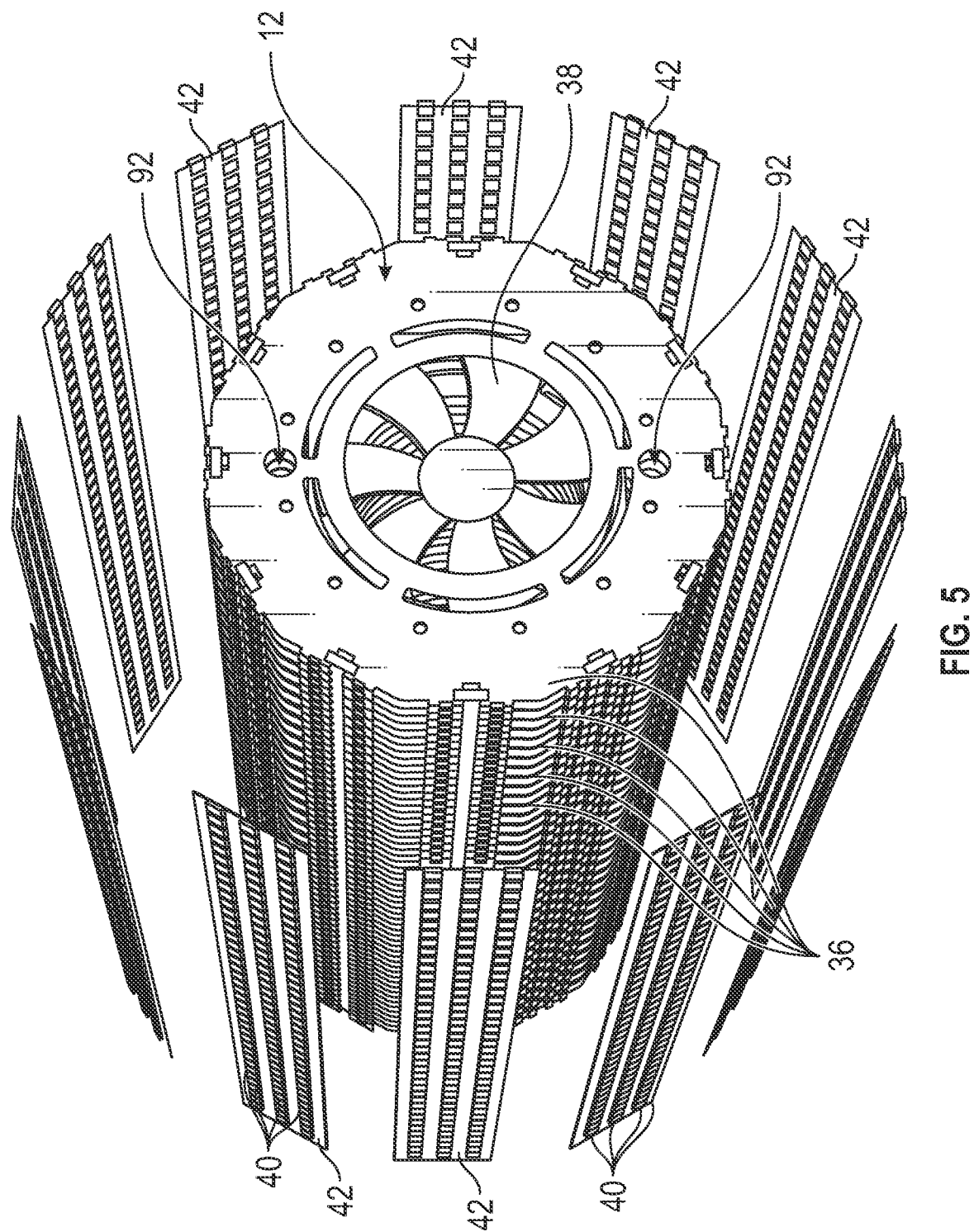
FIG. 5 shows an exploded view of a luminaire in accordance with the present disclosure.

A luminaire 10 and methods of using the luminaire 10 to provide lighting, which may include indirect lighting when utilized with a lighting modifier 102, are provided. FIGS. 1 and 2 show perspective views of the luminaire 10, and FIGS. 3-5 show exploded views of certain components of the luminaire 10. The luminaire 10 has an elongate body 12 having a base end 14 and an opposing top end 16. A base mounting plate 20 is disposed at the base end 14 and a top mounting plate 22 is disposed at the top end 16. The body 12 is disposed between the base mounting plate 20 and the top mounting plate 22. The base mounting plate 20 and the top mounting plate 22 may each have a generally circular shape and generally parallel exterior sides, which may be generally perpendicular to a longitudinal axis 18 that extends from the base end 14 to the top end 16 of the luminaire 10. Each of the base mounting plate 20 and the top mounting plate 22 is designed to be individually mounted onto a mounting structure 106 to support the luminaire 10. Because the base mounting plate 20 and the top mounting plate 22 are designed to be mounted individually, the luminaire 10 may thus be mounted onto the mounting structure 106 using either one of the base mounting plate 20 or the top mounting plate 22 to support the luminaire 10 on the mounting structure 106. Either mounting plate 20 or 22 may be used individually without the other mounting plate to provide adequate mounting support for the luminaire 10. The luminaire 10 may be operated to provide lighting regardless of how the luminaire 10 is mounted, or whether the luminaire 10 is mounted, onto a mounting structure 106. For instance, the luminaire 10 is operable when either one of the base mounting plate 20 or the top mounting plate 22 is mounted onto a mounting structure 106, or when neither the base mounting plate 20 nor the top mounting plate 22 is mounted onto the mounting structure 106, or when both the base mounting plate 20 and the top mounting plate 22 are mounted onto the mounting structure 106, in which case the mounting structure may optionally include two separate structures to which each respective mounting plate 20, 22 is mounted. A specific mounting configuration is not required for the luminaire 10 in order to operate the luminaire 10 to provide lighting because electrical power may be delivered to the luminaire 10 regardless of whether or how the luminaire 10 is mounted.

Figure 12:
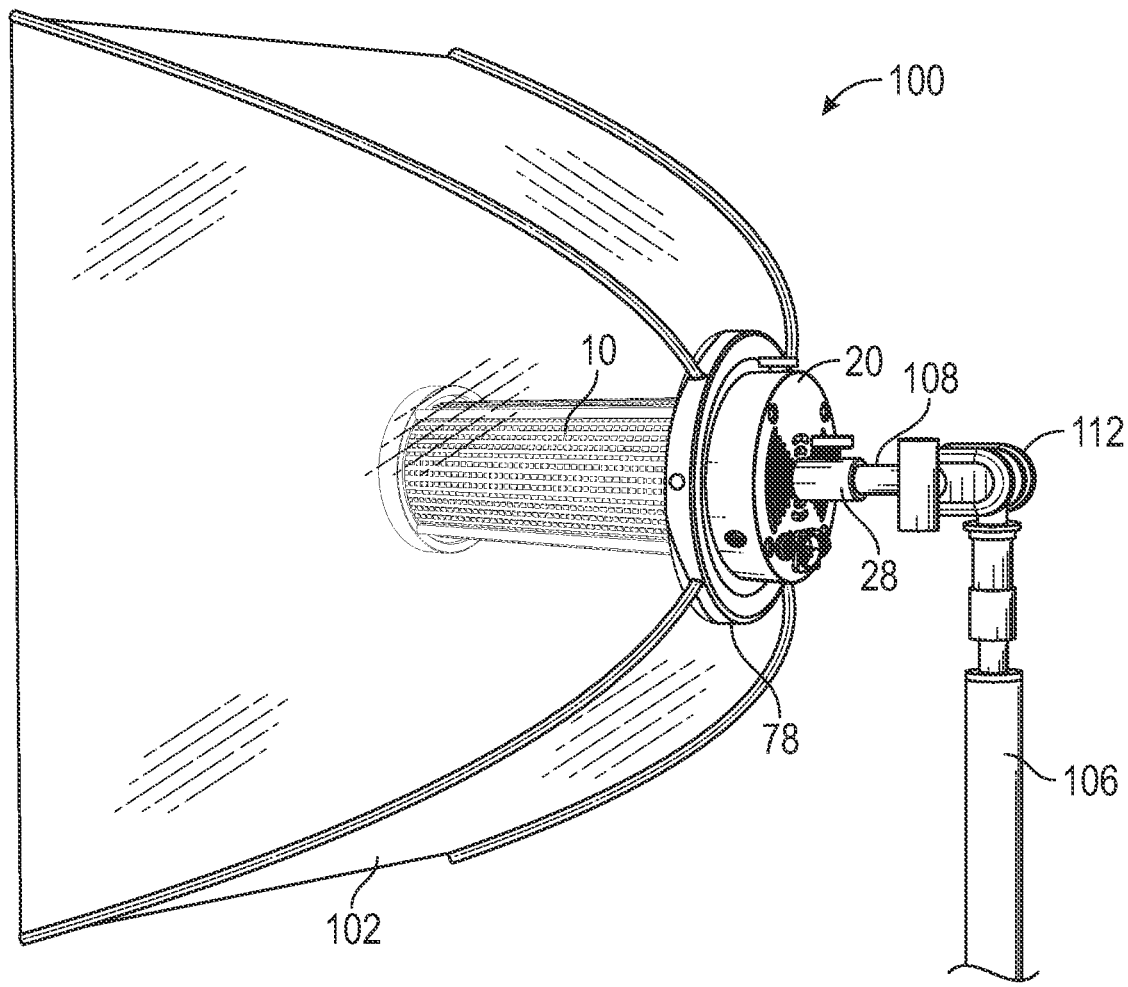
FIG. 12 shows a perspective view of a luminaire mounted onto a stand with a lighting modifier in accordance with the present disclosure.
Figure 14:
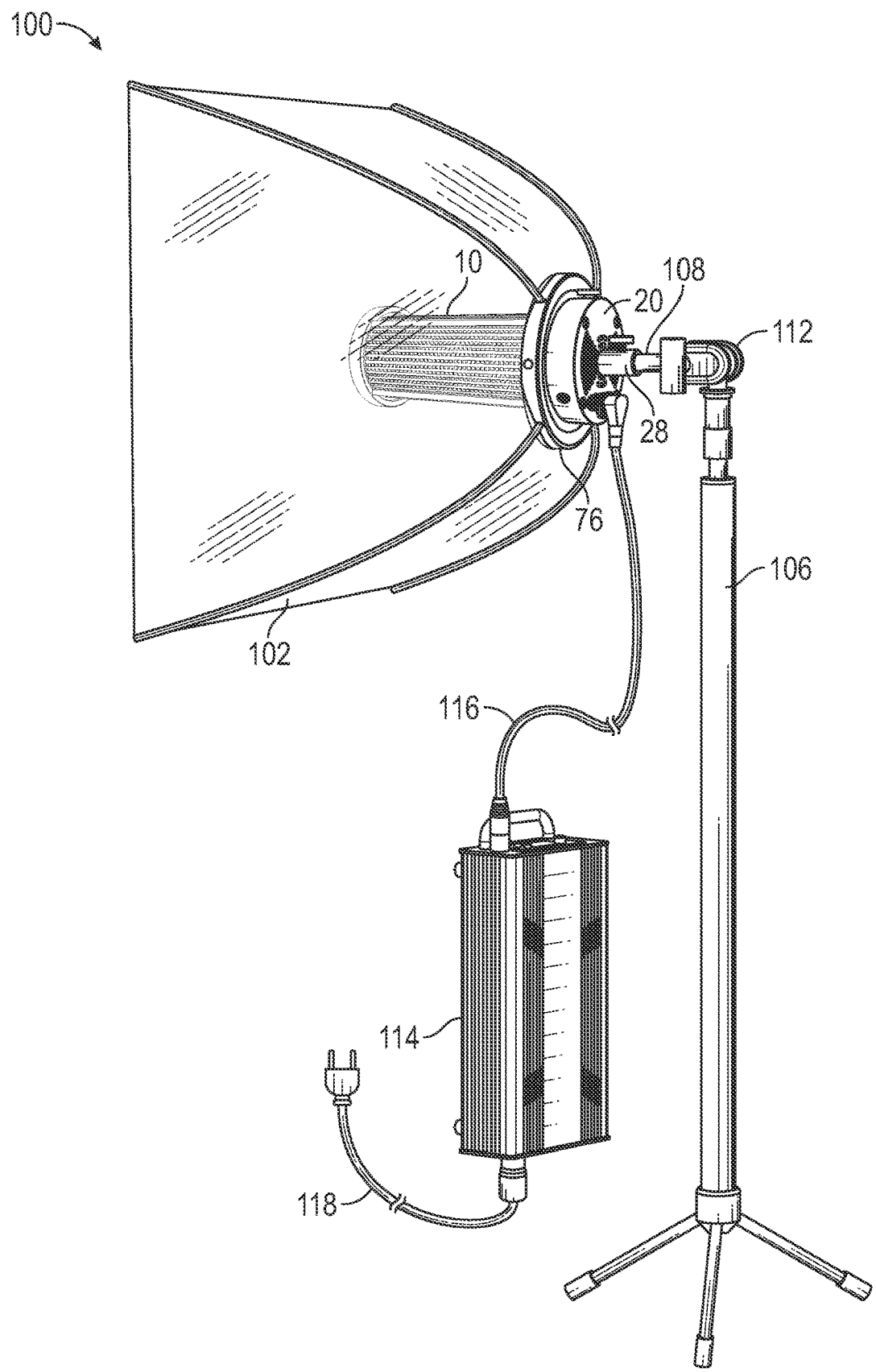
FIG. 14 shows a perspective view of a luminaire connected to a power supply unit and mounted onto a stand with a lighting modifier in accordance with the present disclosure.
Figure 15:
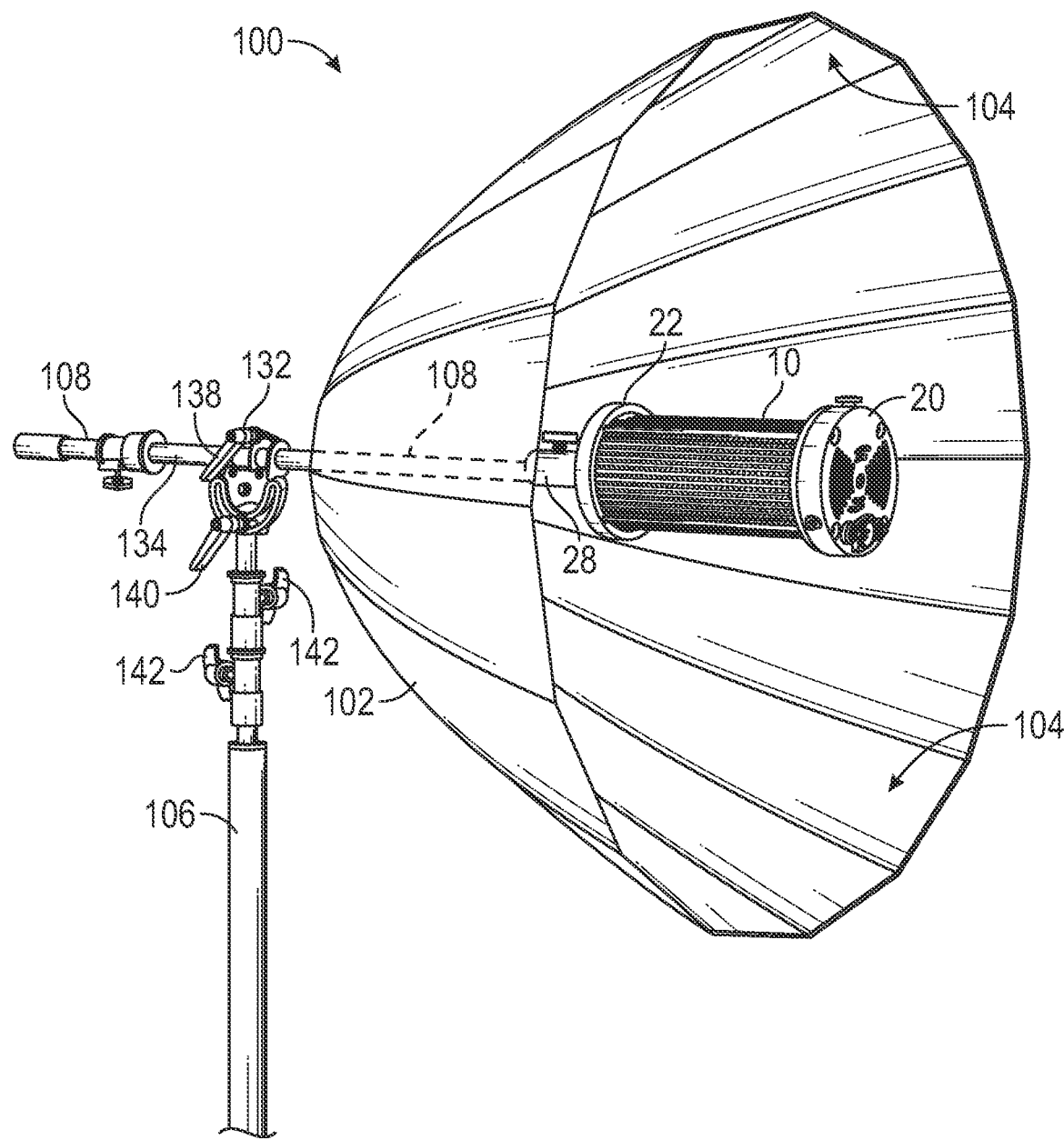
FIG. 15 shows a front perspective view of a luminaire mounted onto a stand with a lighting modifier in accordance with the present disclosure.
Figure 17:
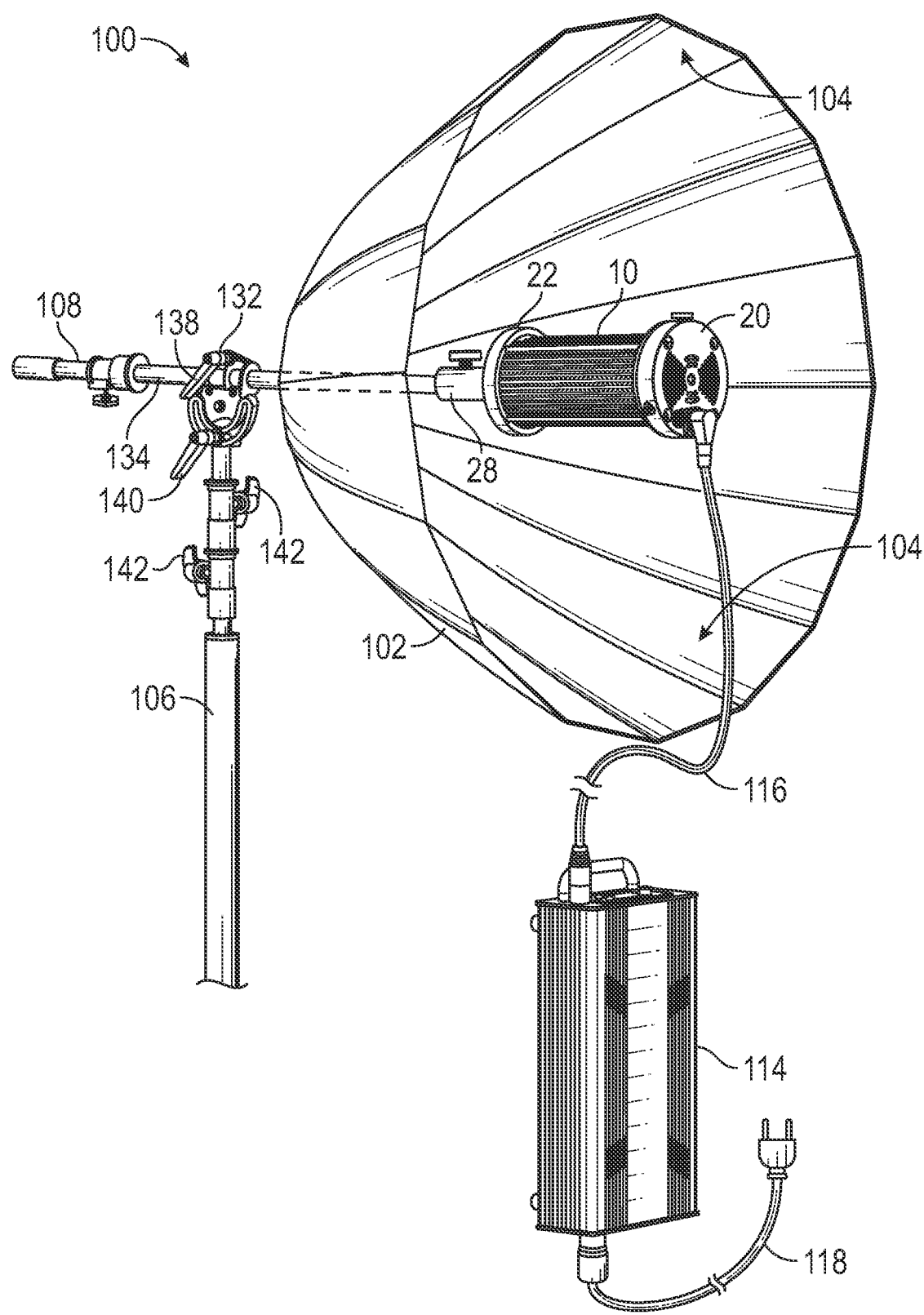
FIG. 17 shows a front perspective view of a luminaire connected to a power supply unit and mounted onto a stand with a lighting modifier in accordance with the present disclosure.

The mounting structure used to support the luminaire 10 may include a mounting arm 108 that is attached to a stand 106 that rests on the ground and supports the luminaire 10 in an elevated position above the ground. The mounting arm 108 and stand 106 may also be used to support the lighting modifier 102. Alternatively, the mounting structure may comprise a structure designed to be handheld by a user or a structure mounted onto a wall or other fixed structure. FIGS. 12 and 14 show the base mounting plate 20 of the luminaire 10 mounted onto a mounting arm 108 of a stand 106, and FIGS. 15 and 17 show the top mounting plate 22 of the luminaire 10 mounted onto a mounting arm 108 of the stand 106. As best seen in FIGS. 14 and 15, the luminaire 10 may be designed so that the mounting arm 108 of the stand 106 is generally aligned with longitudinal axis 18 when the base mounting plate 20 is mounted onto the mounting arm 108 or when the top mounting plate 22 is mounted onto the mounting arm 108.

Figure 6:
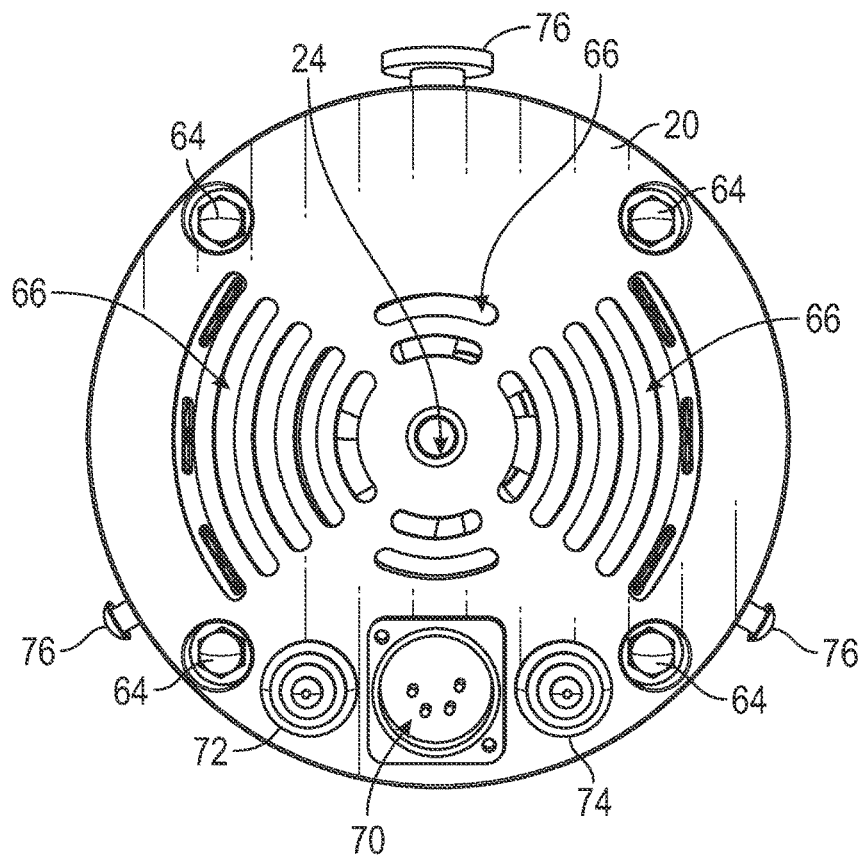
FIG. 6 shows an end view from a base end of a luminaire in accordance with the present disclosure.

The luminaire 10 includes a light source 40 configured to emit light radially from the elongate body 12 relative to a longitudinal axis 18 extending from the base end 14 to the top end 16 of the luminaire 10, as best seen in FIGS. 1-4. The light source may comprise a plurality of lights 40 distributed around an exterior of the body 12. The lights 40 may be distributed both radially around the exterior of the body 12 and longitudinally along a length of the body 12 between the base mounting plate 20 and the top mounting plate 22, as best seen in FIGS. 1 and 2. The light source may alternatively comprise any suitable arrangement of one or more lights configured to emit light outwardly from the body 12 in a radial direction. The light source may emit light radially 360 degrees about axis 18. The lights 40 may be LED (light-emitting diode) lights or other suitable types of lights. The luminaire 10 may include a second light source 44 configured to emit light in an axial direction relative to axis 18 from an exterior side of the top mounting plate 22. The second light source may comprise a plurality of lights 44 disposed on the exterior side of the top mounting plate 22, as best seen in FIG. 2. The second plurality of lights 44 may also be LED lights or other suitable types of lights. The first plurality of lights 40 and the second plurality of lights 44 can be activated independently of each other so that light can be emitted by the luminaire 10 from the first plurality of lights 40 only, from the second plurality of lights 44 only, or from all lights 40, 44 simultaneously. Each set of lights 40 and 44 may be separately controlled by switches 72 and 74, respectively, which may be located on the base mounting plate 20 of the luminaire 10. As best seen in FIGS. 1 and 6, each of the switches 72, 74 may be in the form of a push-button that may be pushed to activate and deactivate lights 40 and 44, respectively.

To facilitate mounting the luminaire 10 onto a mounting structure such as the mounting arm 108 of a stand 106, the base mounting plate 20 and the top mounting plate 22 may each include a fastener designed to separately mount each respective mounting plate 20, 22 onto the mounting structure 106 to fixedly secure the luminaire 10 to the mounting structure. Each fastener may include a threaded section 24, 26 having screw threads, in which case the mounting structure may optionally include corresponding screw threads that are compatible with screw threads 24 or 26. Alternatively, each mounting plate 20 and 22 may include other suitable types of fasteners, such as fastener 32 utilized in combination with a socket 34, for mounting either mounting plate 20, 22 onto the mounting structure 106 so that the luminaire 10 is secured to the mounting structure 106 in a fixed position. The luminaire 10 may be fixedly secured to the mounting structure 106 for normal use utilizing only one of the mounting plates 20, 22. Each respective mounting plate 20, 22 may be designed to be mounted directly onto the mounting structure, or the luminaire 10 may optionally include a connector 28 designed to connect to either the base mounting plate 20 or to the top mounting plate 22 in order to mount either mounting plate 20, 22 onto the support structure to support the luminaire 10. The connector 28 may be further designed to attach to the mounting structure to mount the luminaire 10.

Figure 11:
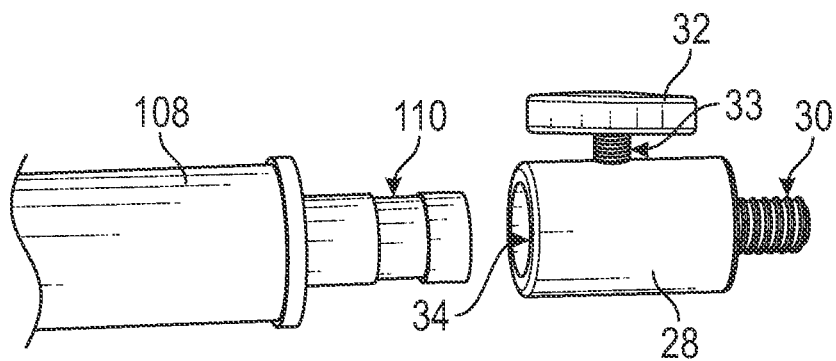
FIG. 11 shows a perspective view of a connector of a luminaire and a partial view of a mounting arm of a stand in accordance with the present disclosure.

As best seen in FIGS. 1 and 2, the base mounting plate 20 may have a first threaded section 24, and the top mounting plate 22 may have a second threaded section 26. Threaded sections 24 and 26 may optionally be used to mount the luminaire directly onto a mounting structure such as a stand 106. Alternatively, the luminaire 10 may further comprise a connector 28 designed to connect either mounting plate 20, 22 to a stand 106 or other mounting structure. In this case, the connector 28 may have a third threaded section 30 at a first end of the connector 28 and a socket 34 at a second end of the connector 28. The third threaded section 30 has screw threads that are compatible with both the first threaded section 24 of the base mounting plate 20 and the second threaded section 26 of the top mounting plate 22. Thus, the connector 28 may be removably secured either to the base mounting plate 20 or to the top mounting plate 22 by mating the third threaded section 30 of the connector 28 with either the first threaded section 24 of the base mounting plate 20 or the second threaded section 26 of the top mounting plate 22, depending on a desired mounting configuration. The third threaded section 30 may have male helical screw threads, and each of the first 24 and second 26 threaded sections may have female helical screw threads designed to mate with the male helical screw threads for fastening the connector 28 to one of the mounting plates 20, 22. The connector 28 may be removed from either mounting plate 20, 22 by rotating the connector 28 to unthread the mated helical threads. When the connector 28 is secured to the luminaire 10, the luminaire 10 may be mounted onto the stand 106 by inserting the mounting arm 108 of the stand 106 into the socket 34 of the connector 28 and then fastening the connector 28 to the mounting arm 108. FIG. 11 shows an end of the mounting arm 108 that is sized for insertion into the socket 34 of the connector 28, which is sized to receive the end of the mounting arm 108. An end section of the mounting arm 108 may have a smaller diameter than the rest of the mounting arm 108. The end section may also have an indentation 110 around a circumference of the end section to help secure the luminaire 10 onto the mounting arm 108. The connector 28 may comprise a fastener 32 designed to removably secure the connector 28 to the mounting arm 108. The fastener 32 may have an exterior knob that allows manual rotation of a threaded shank 33 that extends through an exterior wall of the connector 28 so that an end of the shank 33 extends into an interior of the socket 34. The shank 33 may have male screw threads that mate with female screw threads that extend through a threaded opening in the exterior wall of the connector 28. The fastener 32 may be rotated to force the end of the shank 33 of the fastener 32 against the indented section 110 of the end of the mounting arm 108 when the mounting arm 108 is inserted within the socket 34 to securely fasten the connector 28 to the mounting arm 108. The fastener 32 may also be rotated in an opposite direction to withdraw the shank 33 from the interior of the socket 34 to release the connector 28 from the mounting arm 108. Thus, the base and top mounting plates 20, 22 are designed to provide for different mounting configurations for the luminaire 10 onto a mounting structure 106 by allowing the luminaire 10 to be mounted at either the base end 14 or the top end 16. Alternatively, other suitable types of fasteners may be utilized to removably secure the connector 28 to the mounting structure 106 or to either one of the base or top mounting plates 20, 22. For instance, other suitable types of fasteners that may be utilized for removably securing the connector 28 to a mounting structure 106 or to either of the base or top mounting plates 20, 22 may include, but are not limited to, spring-loaded pins, bayonet mounts, flange mounts, various types of clips, latches, or quick-connect fittings. It should be understood by one of skill in the art that such suitable types of fasteners that allow attachment and detachment of the connector 28 to and from the mounting structure 106 or to and from either mounting plate 20, 22 falls within the scope of the present disclosure. Similar types of fasteners, including spring-loaded pins, bayonet mounts, flange mounts, various types of clips, latches, or quick-connect fittings, may also be utilized to directly mount either mounting plate 20, 22 onto a mounting structure 106 without the use of a separate connector 28. It should be understood by one of skill in the art that such suitable types of fasteners that allow attachment and detachment of either mounting plate 20, 22 to and from the mounting structure 106 also falls within the scope of the present disclosure.

Figure 20:
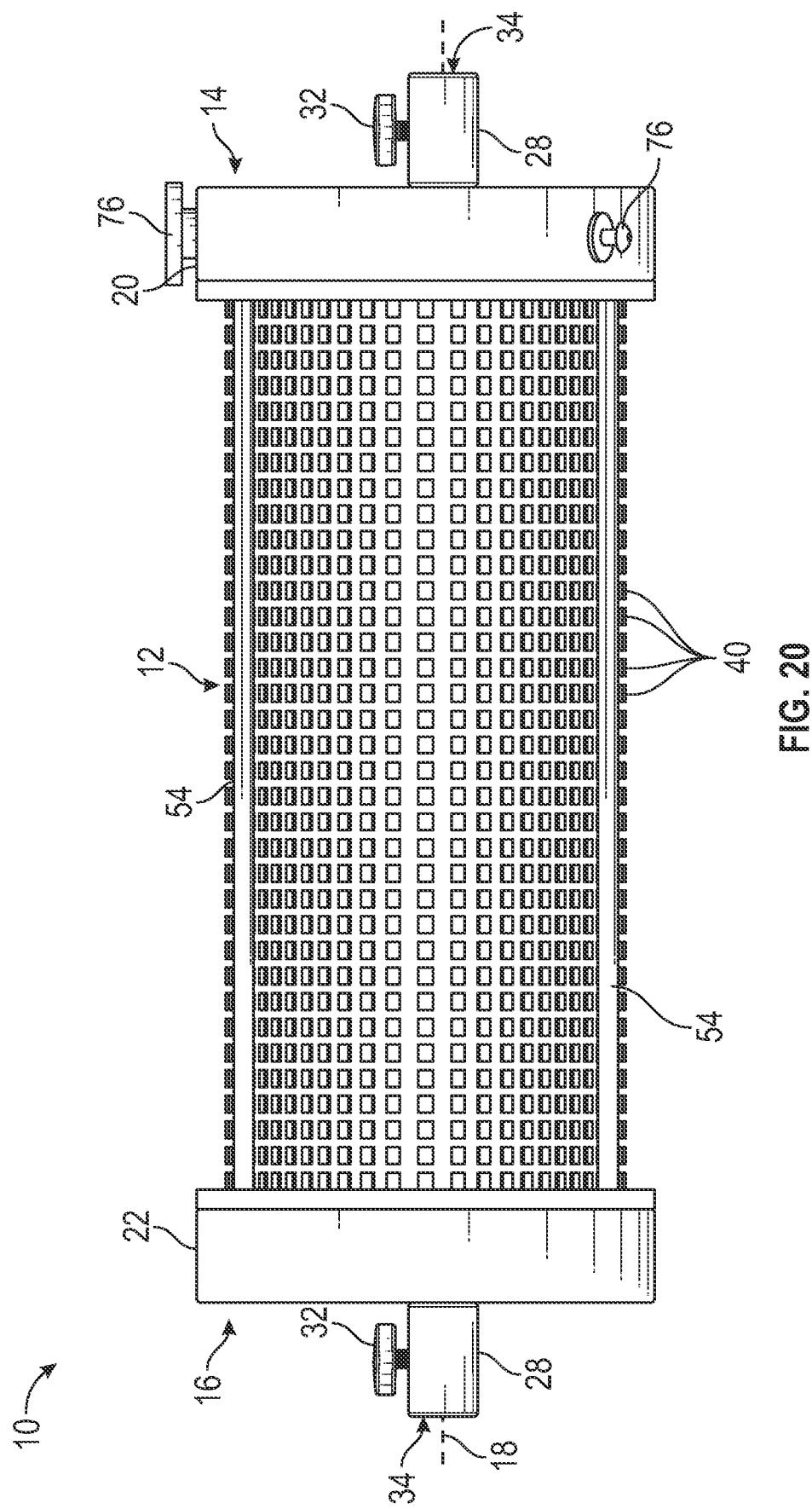
FIG. 20 shows a side view of a luminaire in accordance with the present disclosure.

Alternatively, as shown in FIG. 20, the luminaire 10 may include a connector 28 disposed at each end 14, 16 of the luminaire 10. In this case, the connectors 28 may be designed for removably securing each connector 28 to a respective one of the mounting plates 20, 22. Alternatively, the connectors 28 may be permanently attached to each of the base mounting plate 20 and the top mounting plate 22, respectively. The connectors 28 may be permanently attached in any suitable manner, such as by welding, brazing, or cementing. In this case, the base mounting plate 20 may have a first attachment point 34 and a first fastener 32, which may be designed to removably secure the base mounting plate 20 to a mounting structure 106 at the first attachment point 34, and the top mounting plate 22 may have a second attachment point 34 and a second fastener 32, which may be designed to removably secure the top mounting plate 22 to the mounting structure 106 at the second attachment point 34. The first and second attachment points may include any structure that is mechanically connected to or otherwise physically contacts the mounting structure 106 to fixedly secure one of the mounting plates 20, 22 to the mounting structure 106. As shown in FIG. 20, the first and second attachment points 34 may each be defined by a socket opening, which may be utilized to receive a component of the mounting structure 106 within the socket opening. Alternatively, the attachment points may be defined by other types of structures suitable for attachment of a mounting plate to a mounting structure utilizing a fastener.

The body 12 of the luminaire 10 is elongate and extends between the base mounting plate 20 and the top mounting plate 22. The luminaire 10 may have a generally cylindrical shape arranged around longitudinal axis 18. The body 12 may have a polyhedral shape, while mounting plates 20 and 22 may each have a circular outer shape to give the luminaire 10 a generally cylindrical shape overall. As best seen in FIG. 5, the body 12 of the luminaire 10 preferably comprises a plurality of thin heat sink plates 36 disposed in spaced relation to each other to aid in dispersing heat produced by the lights 40, 44. Alternatively, the body 12 may have other structural forms that provide structure for supporting lights 40 between mounting plates 20 and 22. As such, the "body" of the luminaire 10 may refer to any structure disposed along axis 18 between mounting plates 20 and 22. As best seen in FIG. 4, the body 12 may have an interior passageway 84 that extends through the body 12 in an axial direction along the longitudinal axis 18 between the base mounting plate 20 and the top mounting plate 22. The luminaire 10 may further comprise a fan 38 disposed within an interior of the body 12 and positioned to move air through the interior passageway 84 of the body 12 to help transfer heat away from the heat sink plates 36. As best seen in FIGS. 6-9, the base mounting plate 20 may have a plurality of vent openings 66, and the top mounting plate 22 may also have a plurality of vent openings 68 so that air moved by the fan 38 can move through both mounting plates 20, 22 to facilitate movement of air through the interior passageway 84. Alternatively, other devices and methods may be utilized for cooling the luminaire 10, including, but not limited to, a water cooling system comprising a pump that moves cool water through the fixture. Alternatively, other types of coolants may also be utilized.

The plurality of lights may include a plurality of LED lights 40 operably mounted onto a plurality of printed circuit boards 42 (PCBs), which may each have a generally rectangular shape. FIG. 5 shows an exploded view of the body 12, including the heat sink plates 36, and the PCBs 42 with LEDs installed thereon. LED chips 40 may be soldered onto the PCBs 42. The heat sink plates 36 may each have a polygonal outer shape so that the plurality of spaced plates 36 form a body 12 having a polyhedral shape. This configuration forms a plurality of flat outer surfaces of the body 12 onto which the PCBs 42 may be arranged in a generally cylindrical manner about axis 18. The PCBs 42 may be mounted onto the body 12 using screws or bolts or by otherwise fastening or attaching the PCBs 42 to the heat sink plates 36.

Figure 9:
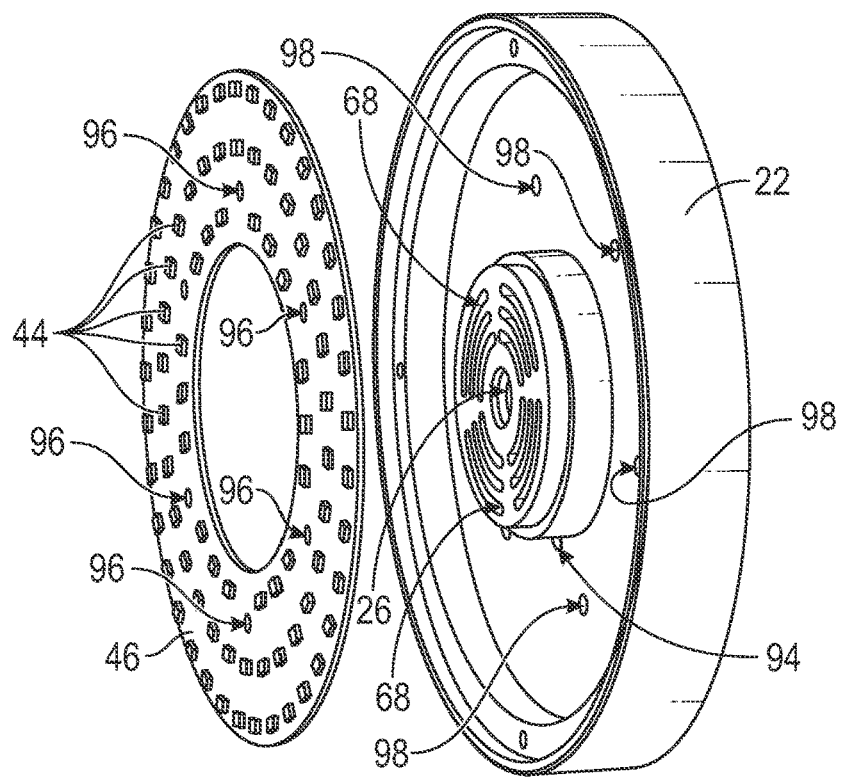
FIG. 9 shows a perspective view of a top mounting plate of a luminaire in accordance with the present disclosure.

The second plurality of lights may include a plurality of LED lights 44 operably mounted onto a printed circuit board 46 (PCB), which may have a generally circular shape. LED chips 44 may be soldered onto the PCB 46. The PCB 46 may be mounted onto an exterior side of the top mounting plate 22 using screws or bolts or by otherwise fastening or attaching the PCB 46 to the top mounting plate 22. FIG. 9 shows an exploded view of the top mounting plate 22 and the PCB 46 with LEDs 44 installed thereon. Screws for fastening PCB 46 to the top mounting plate 22 may be installed through openings 96 in PCB 46 and openings 98 in the top mounting plate 22. The top mounting plate 22 may also have one or more openings 94 that extend through the plate 22 for installation of electrical wiring to PCB 46 to power and control LEDs 44.

As best seen in FIGS. 3 and 4, the luminaire 10 may include a support structure 52, which may be attached to both the base mounting plate 20 and the top mounting plate 22, to provide structural support for components of the luminaire 10. The support structure 52 may comprise a plurality of rods 54 that each extends between the base mounting plate 20 and the top mounting plate 22. Each rod 54 may be attached to the base mounting plate 20 at one end 56 and to the top mounting plate 22 at an opposing end 58, as best seen in FIGS. 1 and 2. Individual rods 54 may be distributed around the exterior of the body 12 of the luminaire 10. Each rod 54 may be removably secured to each of the base mounting plate 20 and the top mounting plate 22. The ends 56, 58 of the rods 54 may each have threaded sections for fastening the rods 54 to the mounting plates 20, 22. Alternatively, other suitable types of support structures may be utilized to attach to the mounting plates 20, 22 to rigidly connect the mounting plates 20, 22 to each other in order to provide structural support to components of the luminaire 10. It should be understood by one of skill in the art that such support structures would still fall within the scope of the present disclosure. Further, it should be understood that the support structure may be integrally attached to or integrally formed with the body of the luminaire 10, or the support structure and body may be otherwise incorporated into a single structure that provides structural support for the luminaire 10 and support for mounting lights 40 between mounting plates 20 and 22.

As shown in FIGS. 3 and 4, the luminaire 10 may include a support ring 50 and a main printed circuit board 48, which may be a ring-shaped circular PCB sized to fit against the support ring 50. The support ring 50 provides support for PCB 48 and separates PCB 48 from the heat sink plates 36 of the body 12 of the luminaire 10. The main PCB 48 is configured to distribute incoming power to LEDs 40 and 44. To assemble the luminaire 10, a threaded end 58 of each rod 54 may be threaded into one respective threaded opening 62 in the top mounting plate 22 to fasten each rod 54 to the top mounting plate 22. The body 12, including the PCBs 42 with LEDs 40, may be positioned against an interior side of the top mounting plate 22 with the rods 54 disposed around the exterior of the body 12. An opposing threaded end 56 of each rod 54 may then be inserted through respective openings 86 in the support ring 50, openings 88 in the main PCB 48, and openings 60 in the base mounting plate 20. As best seen in FIG. 6, which shows an end view of the base end 14 of the luminaire 10, a threaded nut 64 may then be threaded onto each respective threaded end 58 of each rod 54 to fasten the base mounting plate 20 and the top mounting plate 22 to each other to form a rigidly connected structure with the body 12, the support ring 50, and the main PCB 48 all pressed firmly together between the two mounting plates 20, 22 due to pressure applied by tightening the nuts 64.

Figure 7:
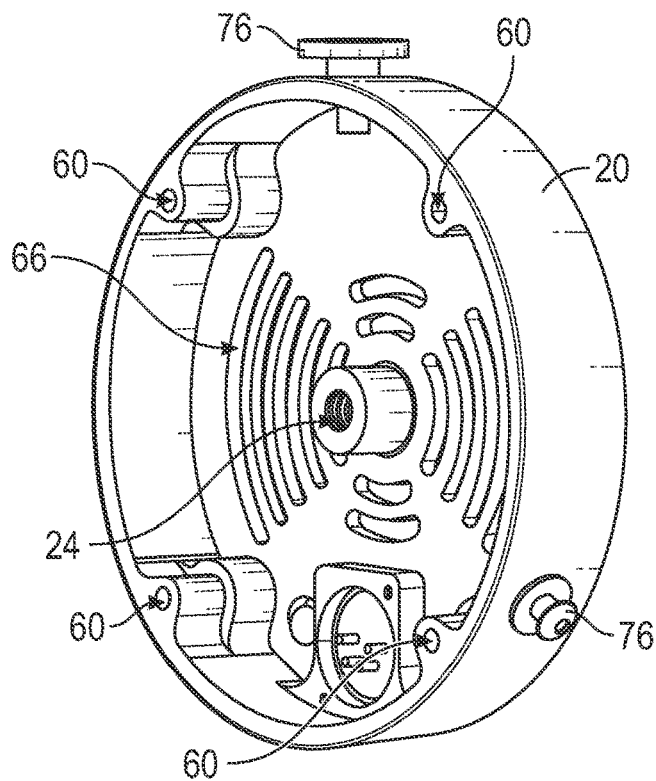
FIG. 7 shows a perspective view of a base mounting plate of a luminaire in accordance with the present disclosure.
Figure 8:
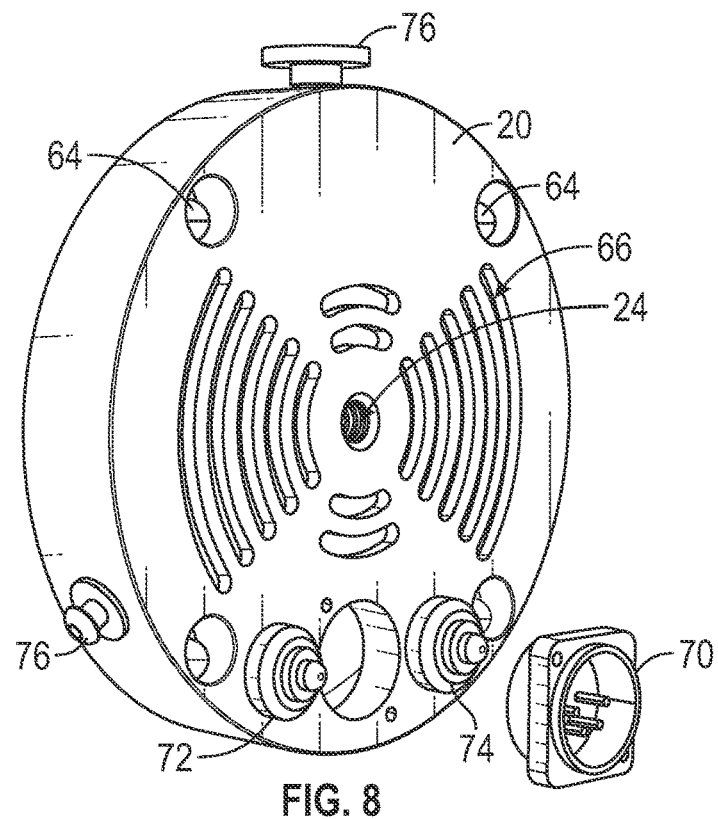
FIG. 8 shows a perspective view of a base mounting plate of a luminaire in accordance with the present disclosure.
Figure 10:
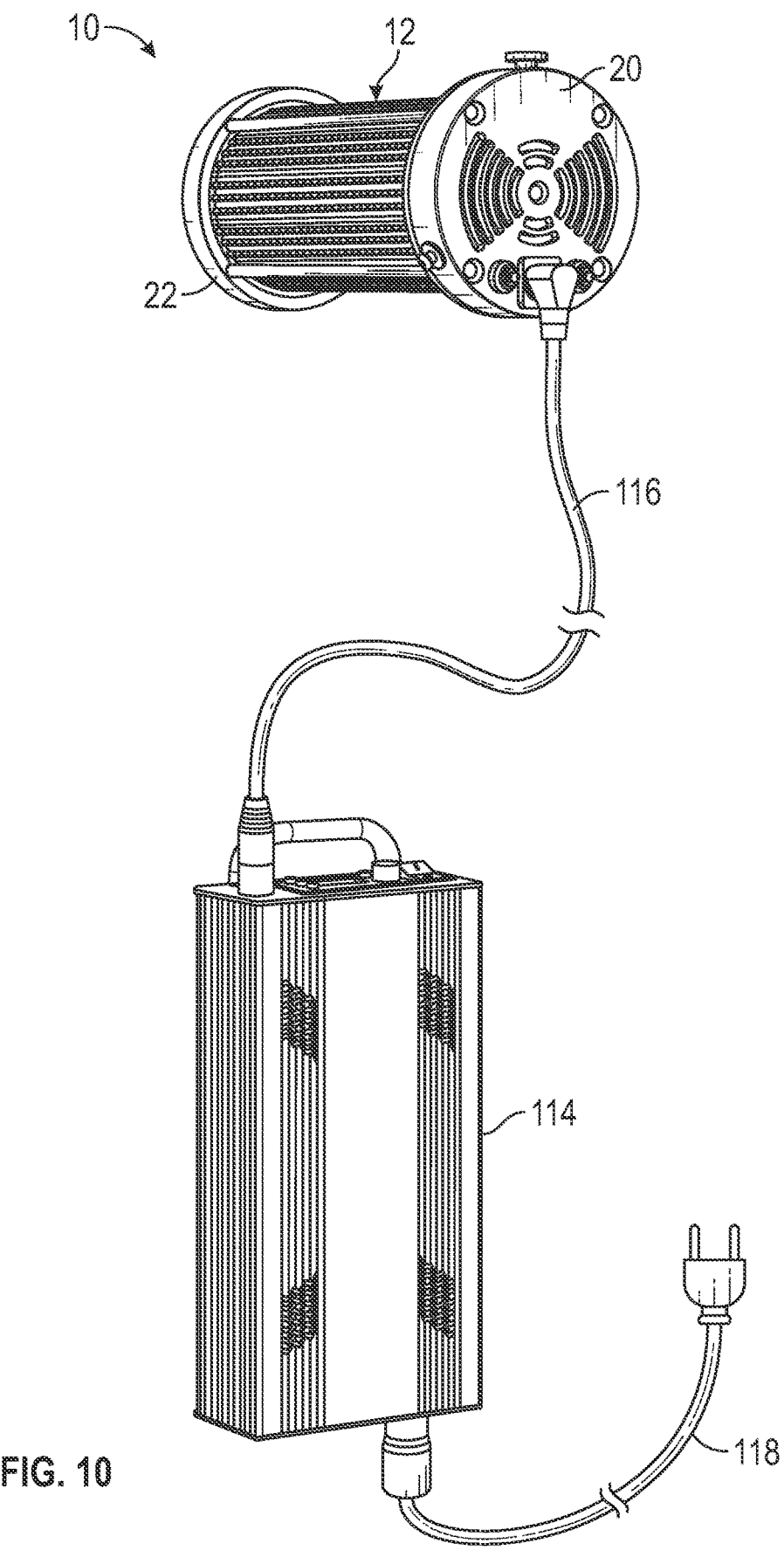
FIG. 10 shows a perspective view of a luminaire connected to a power supply unit in accordance with the present disclosure.

FIGS. 7 and 8 show opposing sides of the base mounting plate 20. The base mounting plate 20 may have an electrical outlet 70 designed to removably attach an electrical cord 116 to the electrical outlet 70 to supply power to lights 40 and 44. The electrical outlet 70 may have a socket and an arrangement of prongs that are compatible with a terminal end of the electrical cord 116 so that the cord 116 may be plugged into the outlet 70 and remain in place, as best seen in FIG. 10. On the interior side of the electrical outlet 70, the prongs may be electrically wired to the main PCB 48, which distributes power to PCBs 42 and 46 to provide power to the luminaire 10, as well as to the fan 38. The main PCB 48 may have soldered connections to PCBs 42. In this case, ends of PCBs 42 may be soldered to the main PCB 48 through slots 85 in the main PCB 48 using soldering pads. Wiring may also electrically connect switches 72 and 74 to PCB 48 and PCB 46, respectively, for separately controlling LEDs 40 and 44, respectively. Wiring from switch 72 may be connected directly to PCB 48 for distributing power to each of PCBs 42 to control operation of LEDs 40. Wiring from switch 74 may be connected directly to PCB 46 to control operation of LEDs 44. When assembling the luminaire 10, wiring from switch 74 to PCB 46 may be installed through openings 90 in the main PCB 48, openings 92 in the body 12, and one or more openings 94 in the top mounting plate 22. A plurality of openings 92 may extend through each of the heat sink plates 36 in alignment through the length of the body 12 for connecting to PCB 46. Wiring may also be installed that connects main PCB 48 to a motor for the fan 38 to power on the fan 38 when the luminaire 10 is powered on.

Figure 18:
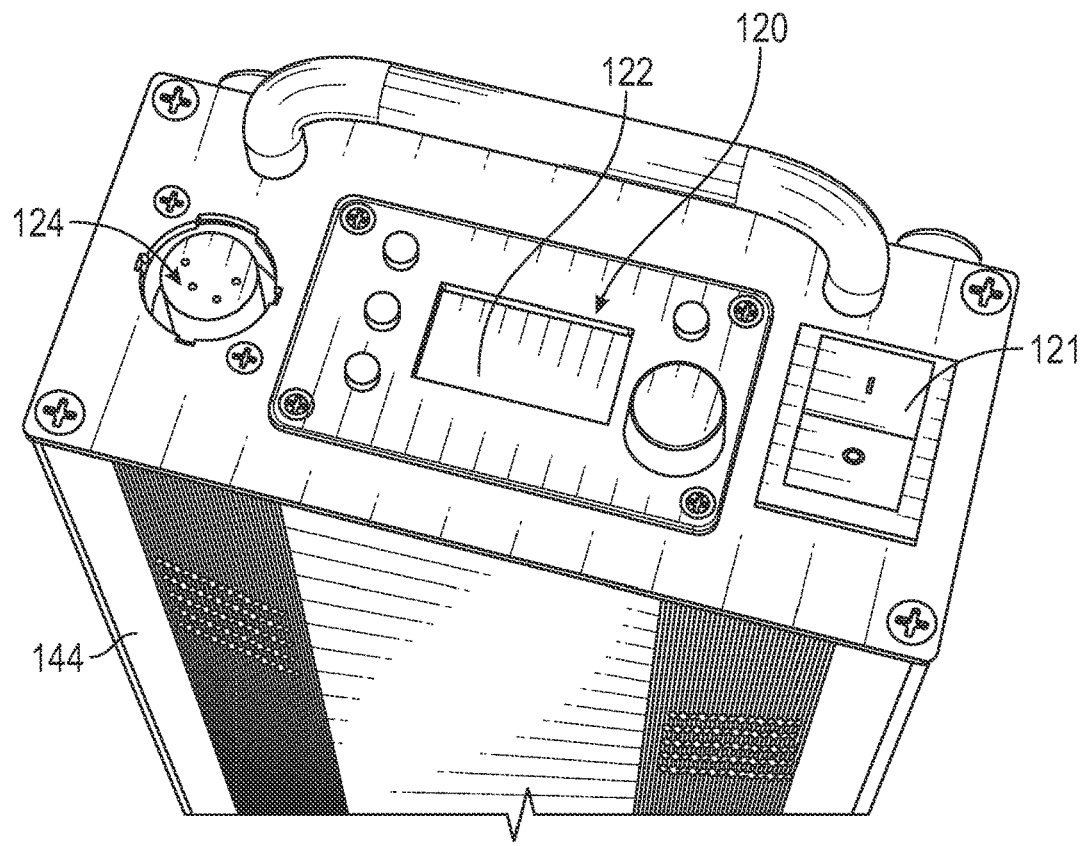
FIG. 18 shows a partial perspective view of a power supply unit for supplying power to a luminaire in accordance with the present disclosure.
Figure 19:
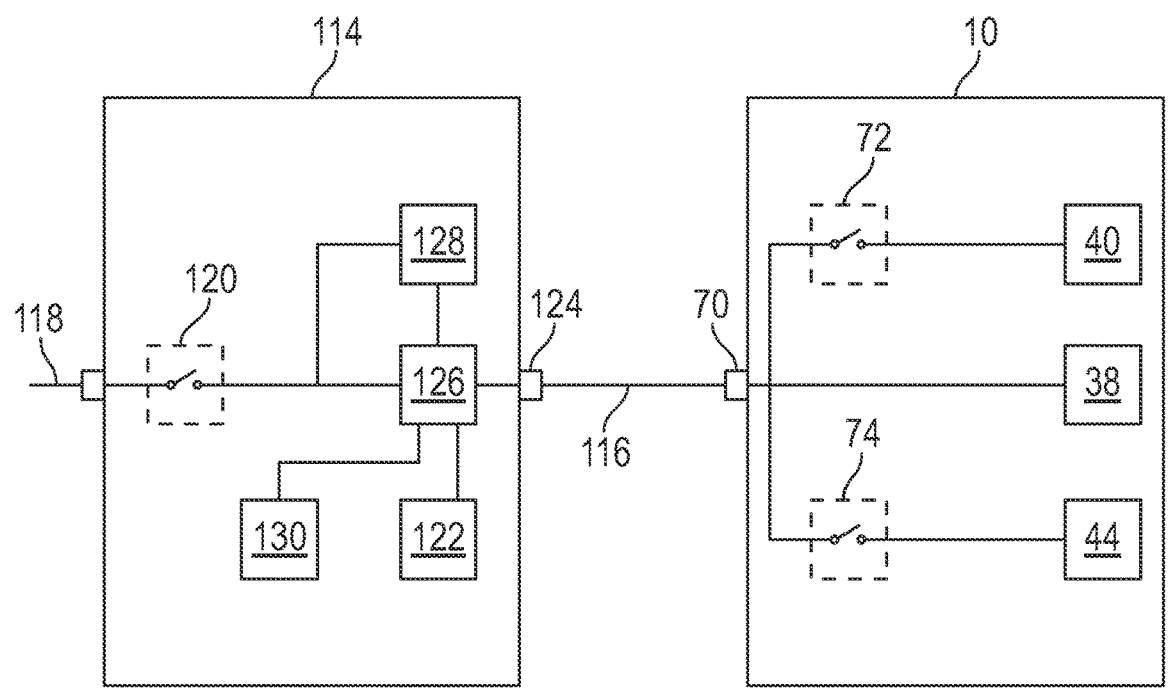
FIG. 19 shows a schematic diagram of a luminaire and power supply unit in accordance with the present disclosure.

The luminaire 10 may further comprise a power supply unit 114 that is external to the body 12 of the luminaire 10, as best seen in FIG. 10. The power supply unit 114 may be electrically connected to the luminaire 10 via the electrical cord 116, which may be plugged into the electrical outlet 70 on the base mounting plate 20 of the luminaire 10 to provide power to lights 40 and 44. The power supply unit 114 may be plugged into mains AC (alternating current) power via a main AC power cord 118 to supply power to the unit 114. The power supply unit 114 includes a control circuit 126 and a voltage regulator 128. FIG. 18 shows a close-up view of a control panel 120 on the exterior of the power supply unit 114 for operating the luminaire 10. FIG. 19 shows a schematic diagram of the luminaire 10 and the power supply unit 114. The power supply unit 114 converts mains AC power to low-voltage regulated DC (direct current) power for powering lights 40 and 44. The control circuit 126 is configured to convert and regulate power to the luminaire 10 and to control operation of the luminaire 10. The power supply unit 114 may include a fan 130 to cool internal components of the unit 114 and may have external vents to facilitate air movement by the fan 130 into and out of the interior of the unit 114. The power supply unit 114 may have an external case, and the control circuit 126, voltage regulator 128, and fan 130 may be disposed within the interior of the unit 114. Alternatively, the control circuit 126 and voltage regulator 128 may be disposed within the body 12 of the luminaire 10. The power supply unit 114 may have an external on/off switch 121 for switching the power on and off to both the power supply unit 114 and the luminaire 10. The power supply unit 114 may also have a luminaire connection outlet 124 designed to plug the electrical power cord 116 into the power supply unit 114.

As best seen in FIG. 18, the power supply unit 114 may have an external control panel 120, which may include a digital display 122. The control panel 120 may also include various controls for controlling optional functions of the luminaire 10. For instance, the control circuit 126 may be configured to provide dimming for lights 40 and 44, settings for which may be displayed on the display screen 122, as well as programmable lighting effects, such as blinking, pulsing, flickering, or other effects. A user may use the control panel 120 to change values relating to such effects, which may be displayed on the display screen 122. The control circuit 126 may also be configured to connect to a DMX channel, which is a digital network communication standard commonly used for theatrical and cinematic lighting applications, to control multiple luminaires 10 and to custom program dimming values of each luminaire 10. The control circuit 126 may also be configured to connect to a WiFi network, which may allow remote control of the luminaire 10 through a mobile application.

As best seen in FIGS. 14 and 17, the luminaire 10 may be utilized as part of a system 100 to provide lighting effects, which may be used in photographic, theatrical, and cinematic settings. The system 100 comprises the luminaire 10, a stand 106 or other mounting structure, and a lighting modifier 102. The lighting modifier 102 comprises a concave inner surface 104 that defines an interior of the lighting modifier 102. The lighting modifier 102 is mountable onto the stand 106 in a position in which the luminaire 10 is disposed within the interior of the lighting modifier 102. The inner surface 104 is reflective so that light emitted by the luminaire 10 is reflected off the inner surface 104 toward a subject, which provides indirect, soft light on the subject. The lighting modifier 102 may be a square softbox, such as the softbox shown in FIGS. 12 and 14, or a parabolic reflector, such as the reflector shown in FIGS. 15-17. Other types of lighting modifiers 102 may also be utilized, including, but not limited to, a spherical or parabolic lamp reflector, a beauty dish, or any type of concave reflector. The luminaire 10 may be mounted onto the stand 106 at the base mounting plate 20 or the top mounting plate 22, depending on a mounting configuration to achieve a desired lighting effect. FIGS. 12 and 14 show the base mounting plate 20 mounted onto the stand 106, and FIGS. 15-17 show the top mounting plate 22 mounted onto the stand 106.

Figure 13:
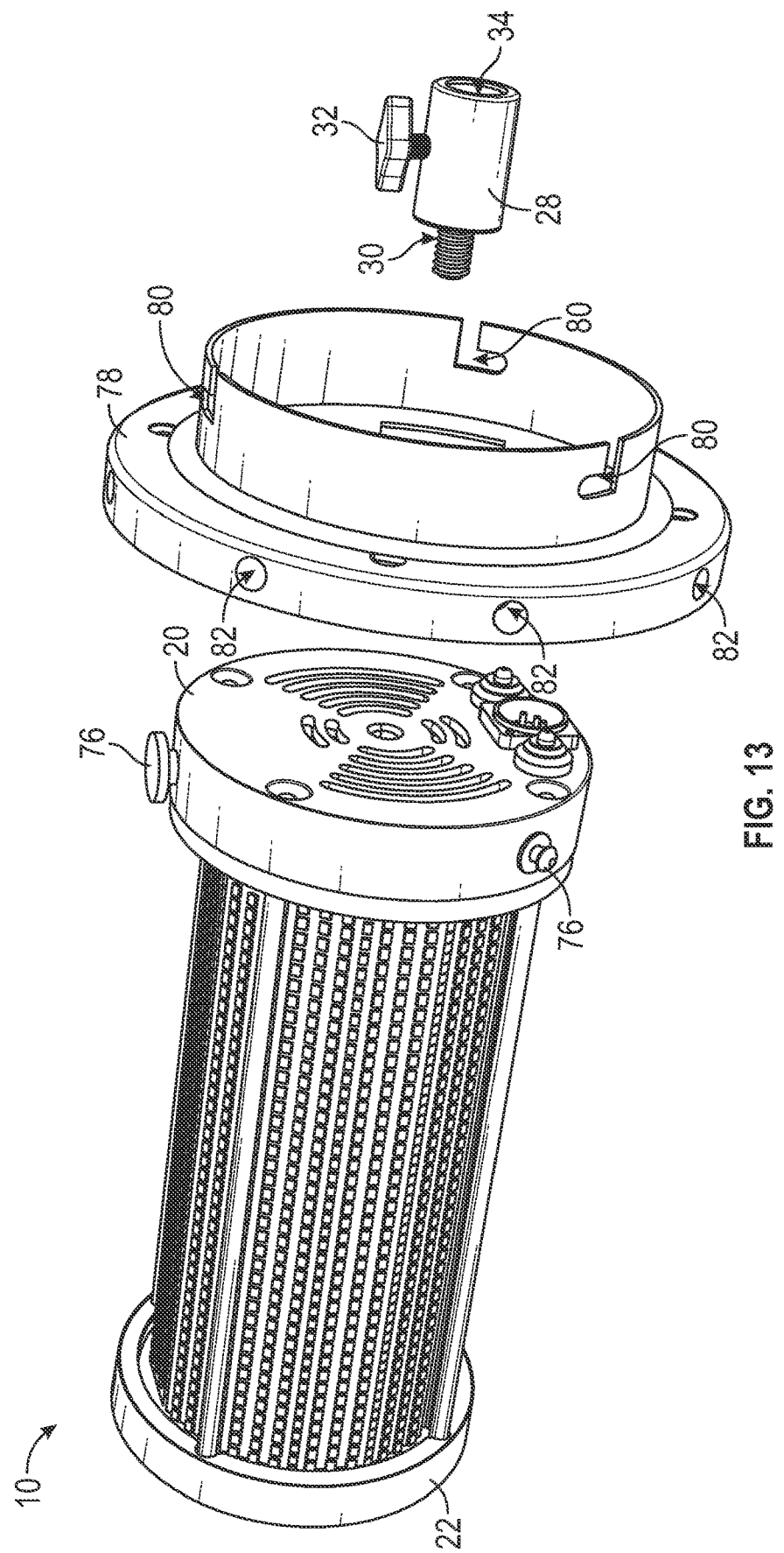
FIG. 13 shows an exploded view of a luminaire with an adapter for attaching a lighting modifier to the luminaire in accordance with the present disclosure.

As best seen in FIG. 13, the system 100 may further comprise an adapter 78 designed to removably attach the lighting modifier 102 to the base mounting plate 20 at the base end 14 of the luminaire 10. Components of the base mounting plate 20 and the adapter 78 may form a bayonet mount. The adapter 78 may have a ringed shape and may be sized to fit around the exterior of the base mounting plate 20, as best seen in FIG. 12. To secure the adapter 78 to the base mounting plate 20, the adaptor 78 may have a plurality of L-shaped mounting slots 80 designed to be compatible with a plurality of radial mounting pins 76 that are attached to the base mounting plate 20 and extend radially outward from the base mounting plate 20. A user may slide the adapter 78 around the top mounting plate 22 and over the body 12 of the luminaire 10. The mounting slots 80 may be aligned with the mounting pins 76 so that each mounting pin 76 is simultaneously inserted into one respective mounting slot 80. The adapter 78 may then be rotated so that the mounting pins 76 rotate within each of the L-shaped mounting slots 80 to secure the adapter 78 to the base mounting plate 20. The adapter 78 may have a plurality of mounting holes 82 for securing the lighting modifier 102 to the adapter 78, as shown in FIG. 12.

When the luminaire 10 is mounted on the base mounting plate 20, the top mounting plate 22 is facing outwardly away from the inner surface 104 of the lighting modifier 102. In this case, the lights 40 distributed around the body 12 of the luminaire 10 may be activated by switch 72 to provide indirect light from the modifier 102 onto the subject, while the outwardly facing lights 44 on the top mounting plate 22 may be deactivated by switch 74 to minimize direct light on the subject. As shown in FIGS. 12 and 14, the mounting arm 108 of the stand 106 may be relatively short, and the stand 106 may include a joint 112 that allows vertical pivoting of the lighting modifier 102 and luminaire 10 to position the modifier 102 in a desired lighting position. The joint 112 may also allow rotation within a vertical portion of the stand 106. The stand 106 may also be designed to allow height adjustment of the modifier 102. Once the lighting modifier 102 and luminaire 10 are mounted onto the stand 106, the electrical cord 116 may be plugged into the electrical outlet 70 of the luminaire 10, as shown in FIG. 14, to provide power to the luminaire 10. The power supply box 114 may then be plugged into mains AC power using the main AC power cord 118. Alternatively, an external battery may be used as a power source and may be electrically connected to the power supply box 114.

Figure 16:
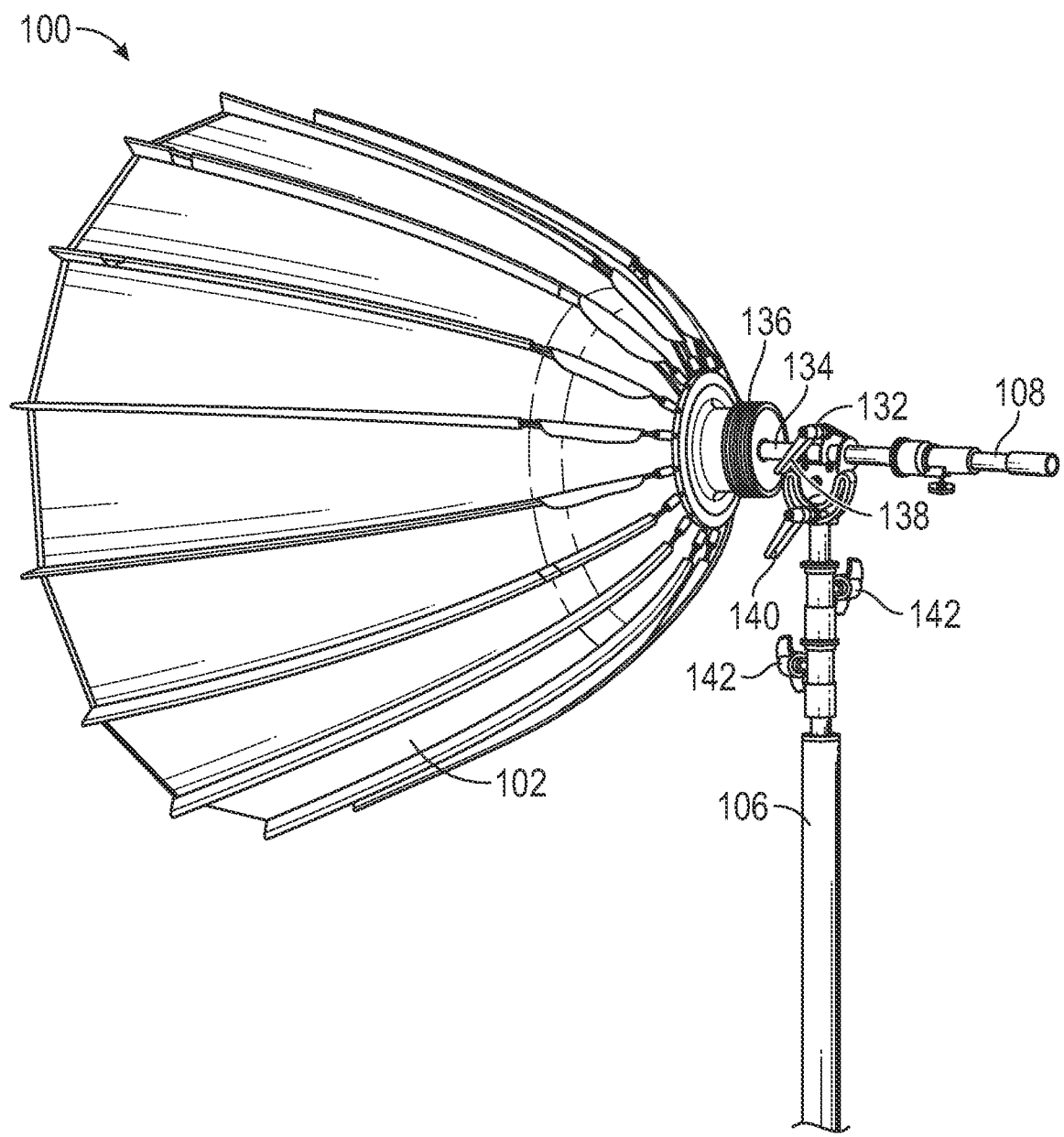
FIG. 16 shows a rear perspective view of a lighting modifier mounted onto a stand in accordance with the present disclosure.

FIGS. 15-17 show the top mounting plate 22 mounted onto the stand 106. In this case, the stand 106 may include a joint 132 in which the mounting arm 108 is slidably mounted within a sheath 134 so that the position of the luminaire 10 within the interior of the lighting modifier 102 may be adjusted by sliding the mounting arm 108 within the sheath 134, which may be used to adjust the quality of the light produced by the system 100. Handle 138 may be utilized to lock and to release the mounting arm 108 within the sheath 134. The lighting modifier 102 may also be mounted onto the exterior of the sheath 134 in which the mounting arm 108 is disposed. As best seen in FIG. 16, the lighting modifier 102 may be mounted onto the sheath 134 by a collar 136 having a central opening that fits tightly around the exterior of the sheath 134 to securely hold the lighting modifier 102 in place. The joint 132 may also allow vertical pivoting of the lighting modifier 102 and luminaire 10 to position the modifier 102 in a desired lighting position. Handle 140 may be utilized to lock and to release the joint 132 in place to allow adjustment of the vertical pivot position. The stand 106 may also include one or more knobs 142 that allow vertical adjustment of the lighting modifier 102 and luminaire 10 by locking and releasing one or more telescoping vertical extensions. Once the lighting modifier 102 and luminaire 10 are mounted onto the stand 106 in a desired position, the electrical cord 116 may be plugged into the electrical outlet 70 of the luminaire 10, as shown in FIG. 17, to provide power to the luminaire 10. In this mounting configuration, the luminaire 10 is mounted on the top mounting plate 22 with the top mounting plate 22 facing inwardly toward the inner surface 104 of the lighting modifier 102 and the base mounting plate 20 facing outwardly away from the inner surface 104 of the lighting modifier 102. In this configuration, the lights 44 on the top mounting plate 22 may optionally be activated by switch 74 to emit additional light directly toward the innermost portion of the inner surface 104 of the lighting modifier 102 in order to provide additional indirect light bounced off of the reflective inner surface 104 of the modifier 102. The quality of this light may be altered by adjusting the distance between the lights 44 on the top mounting plate 22 and the inner surface 104 of the lighting modifier 102, which may be done by sliding the mounting arm 108 within the sheath 134 to a desired position. In either mounting configuration, switches 72 and 74 may be used to independently control lights 40 and 44, respectively.

It is understood that versions of the present disclosure may come in different forms and embodiments. Additionally, it is understood that one of skill in the art would appreciate these various forms and embodiments as falling within the scope of the invention as disclosed herein.

What is claimed is:

1. A luminaire comprising:
an elongate body having a base end and an opposing top end, and defining a longitudinal axis extending therebetween;
a first light source provided in the body and configured to emit light radially relative to the longitudinal axis;
a base mounting plate disposed at the base end, and a top mounting plate disposed at the top end, wherein each of the base mounting plate and the top mounting plate is configured to be individually coupled to a mounting structure to support the luminaire;
a support structure attached to both the base mounting plate and the top mounting plate, wherein the support structure comprises a plurality of rods extending between the base mounting plate and the top mounting plate, each rod attached to the base mounting plate at one end and to the top mounting plate at an opposing end; and
an electrical outlet configured to removably receive an electrical cord to supply power to the light source.

2. The luminaire of claim 1, further comprising a connector configured to connect to either one of the base mounting plate or to the top mounting plate, the connector further configured to attach to the mounting structure to mount the luminaire.

3. The luminaire of claim 1, wherein the electrical outlet is disposed on the base mounting plate.

4. The luminaire of claim 1, further comprising a power supply unit including a voltage regulator and a control circuit, and an electrical cord, wherein the power supply unit is external to the body of the luminaire, and the electrical cord connects the power supply unit to the electrical outlet of the luminaire.

5. The luminaire of claim 1, wherein the body has a generally cylindrical shape.

6. The luminaire of claim 1, further comprising a second light source disposed on the top mounting plate and configured to emit light in an axial direction relative to the longitudinal axis.

7. The luminaire of claim 6, further comprising a plurality of switches, wherein the first light source and the second light source are individually controllable by the switches.

8. The luminaire of claim 1, the body further comprising a plurality of heat sink plates disposed in spaced relation to each other, wherein the body defines an interior passageway extending through the body in an axial direction between the base end and the top end.

9. The luminaire of claim 8, further comprising a fan disposed within an interior of the body, the fan positioned to move air through the interior passageway of the body.

10. A luminaire comprising:
an elongate body having a base end and an opposing top end;
a first plurality of lights distributed around an exterior of the body;
a base mounting plate disposed at the base end and a top mounting plate disposed at the top end, wherein the base mounting plate has a first threaded section, wherein the top mounting plate has a second threaded section; and
a connector having a first end and a second end, wherein the connector has a third threaded section at the first end, wherein the third threaded section has screw threads that are compatible with both the first threaded section and the second threaded section, wherein the connector has a socket at the second end.

11. The luminaire of claim 10, wherein the luminaire has a generally cylindrical shape.

12. The luminaire of claim 10, further comprising a second plurality of lights disposed on an exterior side of the top mounting plate.

13. The luminaire of claim 12, further comprising a plurality of switches, wherein the first plurality of lights and the second plurality of lights are individually controllable by the switches.

14. The luminaire of claim 10, the body further comprising a plurality of heat sink plates disposed in spaced relation to each other, wherein the body defines an interior passageway extending through the body in an axial direction between the base end and the top end.

15. The luminaire of claim 14, further comprising a fan disposed within an interior of the body, the fan positioned to move air through the interior passageway of the body.

16. The luminaire of claim 10, further comprising a support structure attached to both the base mounting plate and the top mounting plate, wherein the support structure comprises a plurality of rods extending between the base mounting plate and the top mounting plate, each rod attached to the base mounting plate at one end and to the top mounting plate at an opposing end.

17. The luminaire of claim 16, wherein each rod is removably secured to each of the base mounting plate and the top mounting plate.

18. The luminaire of claim 10, further comprising a power supply unit that is external to the body of the luminaire, wherein the power supply unit comprises a voltage regulator and a control circuit.

19. The luminaire of claim 18, further comprising an electrical outlet provided on the base mounting plate; and an electrical cord configured to be plugged into the electrical outlet, wherein the power supply unit is electrically connected to the luminaire via the electrical cord plugged into the electrical outlet.

20. A lighting system, comprising:
a luminaire comprising:
an elongate body having a base end and an opposing top end,
a first light source configured to emit light radially from the body relative to a longitudinal axis extending from the base end to the top end,
a base mounting plate disposed at the base end and a top mounting plate disposed at the top end;
a stand having a mounting arm, wherein each of the base mounting plate and the top mounting plate is configured to be individually mounted onto the mounting arm to support the luminaire; and
a lighting modifier including a concave inner surface defining an interior of the lighting modifier, wherein the lighting modifier is mountable onto the stand such that the luminaire is disposed within the interior of the lighting modifier.

21. The lighting system of claim 20, further comprising an adapter configured to removably attach the lighting modifier to the base mounting plate of the luminaire.

22. The lighting system of claim 20, further comprising a support structure attached to both the base mounting plate and the top mounting plate.

23. The lighting system of claim 22, wherein the support structure comprises a plurality of rods extending between the base mounting plate and the top mounting plate, each rod attached to the base mounting plate at one end and to the top mounting plate at an opposing end.

24. The lighting system of claim 20, further comprising a connector configured to connect to either one of the base mounting plate or to the top mounting plate, the connector further configured to attach to the mounting arm to mount the luminaire.

25. The lighting system of claim 24, wherein the base mounting plate has a first threaded section, wherein the top mounting plate has a second threaded section, wherein the connector has a first end and a second end, wherein the connector has a third threaded section at the first end, wherein the third threaded section has screw threads that are compatible with both the first threaded section and the second threaded section, wherein the connector has a socket at the second end, wherein the socket of the connector is sized to receive an end of the mounting arm within the socket, wherein the connector further comprises a fastener designed to removably secure the connector to the mounting arm.

26. The lighting system of claim 20, wherein the luminaire further comprises a second light source disposed on the top mounting plate and configured to emit light in an axial direction relative to the longitudinal axis.

27. The lighting system of claim 26, further comprising a plurality of switches, wherein the first light source and the second light source are individually controllable by the switches.

28. The lighting system of claim 20, further comprising a power supply unit that is external to the body of the luminaire, wherein the power supply unit comprises a voltage regulator and a control circuit.

29. The lighting system of claim 28, further comprising an electrical outlet provided on the base mounting plate; and an electrical cord configured to be plugged into the electrical outlet, wherein the power supply unit is electrically connected to the luminaire via the electrical cord plugged into the electrical outlet.

\* \* \* \* \*